United States Patent
Takahira et al.

(10) Patent No.: US 6,891,687 B1
(45) Date of Patent: May 10, 2005

(54) MAGNETIC RECORDING/REPRODUCING APPARATUS CAPABLE OF RECORDING/ REPRODUCING DATA AT THE SAME HEAD-CYLINDER REVOLVING SPEED/CONFIGURATION

(75) Inventors: Ryoichi Takahira, Osaka (JP); Hiroyuki Shimogome, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/869,535
(22) PCT Filed: Oct. 27, 2000
(86) PCT No.: PCT/JP00/07532
§ 371 (c)(1), (2), (4) Date: Jun. 29, 2001
(87) PCT Pub. No.: WO01/33557
PCT Pub. Date: May 10, 2001

(30) Foreign Application Priority Data

Oct. 29, 1999 (JP) .......................................... P11-308440

(51) Int. Cl.$^7$ ................................................ G11B 5/00
(52) U.S. Cl. .......................... 360/8; 360/70; 360/77.13
(58) Field of Search ............................. 360/29, 8, 51, 360/70, 77.12, 77.13; 386/5, 131, 109, 110, 78, 85, 27, 33, 13, 67

(56) References Cited

U.S. PATENT DOCUMENTS

| 4,167,023 A | * | 9/1979 | Bessette | 360/70 |
| 5,045,954 A | * | 9/1991 | Oishi | 360/8 |
| 6,233,391 B1 | * | 5/2001 | Morikawa | 386/67 |

FOREIGN PATENT DOCUMENTS

| JP | 08-147609 | 6/1996 |
| JP | 10-214460 | 8/1998 |

* cited by examiner

Primary Examiner—Alan T. Faber
(74) Attorney, Agent, or Firm—McDermott Will & Emery LLP

(57) ABSTRACT

An input signal is recorded in a recording tape α by converting the input signal to a record signal through the modulation performed at the timing corresponding to the previously-specified number of tracks per division of signal by using input-signal converting means 1,2, 3, and 10 and then rotating a head cylinder 8 at a revolving speed lower than the revolving speed of the head cylinder 8 corresponding to the timing for modulation and corresponding to a recording rate adjusted by the recording-rate adjusting means 12 by using recording means 7, 8, 9, 10, and 11. Thereby, it is possible to make the configuration of a head cylinder same even for a system in which the number of tracks per division of signal differs due to the difference in compressibility.

20 Claims, 12 Drawing Sheets

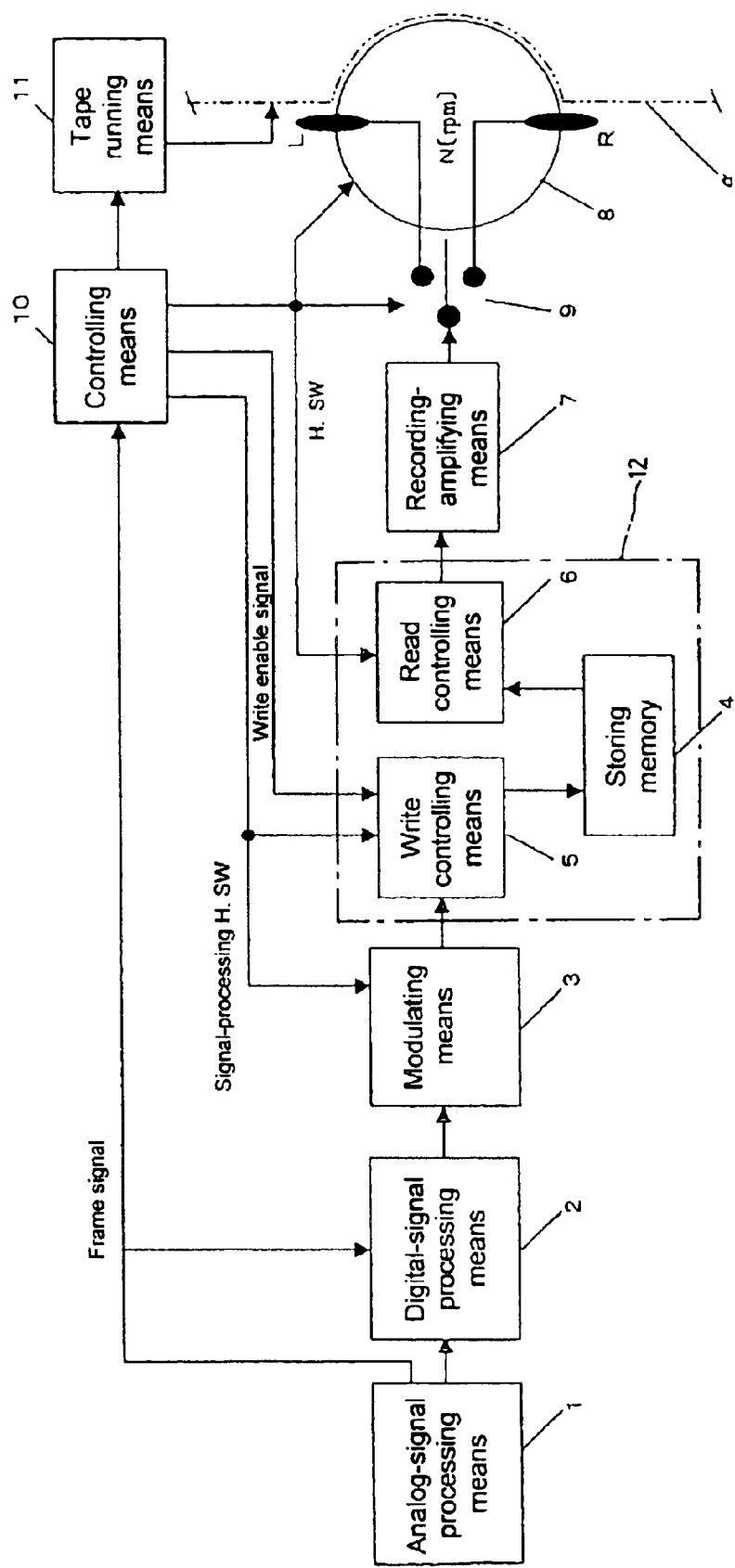
F I G. 1

MAGNETIC RECORDING/REPRODUCING APPARATUS CAPABLE OF RECORDING/ REPRODUCING DATA AT THE SAME HEAD- CYLINDER REVOLVING SPEED/ CONFIGURATION

TECHNICAL FIELD

The present invention relates to a magnetic recording/reproducing apparatus capable of recording/reproducing data at the same head-cylinder revolving speed or the same head-cylinder configuration even if the number of tracks on a recording tape differs due to the difference in compressibility.

BACKGROUND ART

FIG. 7 shows a configuration of a conventional magnetic recording/reproducing apparatus necessary for recording, FIGS. 8 and 9 show operational illustrations under recording, FIG. 10 shows a configuration of a conventional recording/reproducing apparatus necessary for reproducing, and FIGS. 11 and 12 show operational illustrations under reproducing.

The configuration of the magnetic recording/reproducing apparatus necessary for recording is provided with analog-signal processing means 101, digital-signal processing means 102, modulating means 103, recording-amplifying means 104, a head cylinder 106, switching means 105, and controlling means 107.

The analog-signal processing means 101 applies analog processing and digital conversion to a received video input signal. The digital-signal processing means 102 compresses the data digitized by the analog-signal processing means 101 and adds an error correction code to the data. The modulating means 103 performs the modulation for recording the digital data compressed and provided with an error correction code on a recording tape α. The recording-amplifying means 104 amplifies an output of the modulating means 103. The head cylinder 106 records an output of the recording-amplifying means 104 in the recording tape α. The switching means 105 switches whether to supply an output of the recording-amplifying means 104 to right or left head of the head cylinder 106. The controlling means 107 controls operations of the above configuration necessary for recording.

FIG. 8 is an operational illustration under recording in the case of a compressibility constituted of 10 tracks per frame on the recording tape α, in which symbols denote the following signals.

Symbol (8-a) denotes a frame signal included in a video input signal. Symbol (8-b) denotes a signal-processing H.SW signal for recording data in the recording tape α at a cycle five times larger than that of the frame signal (8-a). Symbol (8-c) denotes a modulated output that is an output of the modulating means 103. Symbol (8-d) denotes the same-cycle H.SW signal synchronizing with the SW signal (8-b), which controls switching by the switching means 105 and rotation of the head cylinder 106. The half cycle of the H.SW signal (8-d) shows one track on the recording tape α. Symbol (8-e) denotes a recording head L or R of the head cylinder 106 switched by the switching means 105. Symbol (8-f) denotes a record signal recorded in the recording tape α. Symbol (8-g) denotes a conceptual illustration of tracks and a frame recorded in the recording tape α.

FIG. 9 is an operational illustration under recording in the case of a compressibility constituted of five tracks per frame on the recording tape α, in which symbols denote the following signals.

Symbol (9-a) denotes a frame signal included in a video input signal. Symbol (9-b) denotes a signal-processing H.SW signal that is set to a cycle five times larger than that of the frame signal (9-a) synchronously with the frame signal (9-a). The signal-processing H.SW signal (9-b) shows one track on the recording tape α of the head cylinder 106. Symbol (9-c) denotes an output (modulated output) of the modulating means 103. Symbol (9-d) denotes an H.SW signal having the same cycle as the SW signal (9-b) synchronizing with the signal (9-b), which controls rotation of the head cylinder 106. The half cycle of the H.SW signal (9-d) shows one track on the recording tape a. Symbol (9-e) denotes an H.SW2 signal for switching heads of the head cylinder 106. Symbol (9-f) denotes a recording head L or R' of the head cylinder 106 switched by the switching means 105. Symbol (9-g) denotes a record signal recorded in the recording tape a. Symbol (9-h) denotes a conceptual illustration of tracks and a frame recorded in the recording tape a.

The configuration of the magnetic recording/reproducing apparatus necessary for reproducing is provided with reproducing-amplifying means 111, demodulating means 112, digital-signal processing means 113, analog-signal processing means 114, and controlling means 115.

The reproducing-amplifying means 111 amplifies a reproduction signal fetched from the recording tape a through the head cylinder 106 and switching means 105. The demodulating means 112 demodulates a reproduction signal. The digital-signal processing means 113 performs extension and error correction. The analog-signal processing means 114 outputs a video signal to an external unit. The controlling means 115 controls operations of the above configuration necessary for reproducing.

FIG. 11 is an operational illustration under reproducing in the case of a compressibility constituted of ten tracks per frame on a recording tape, in which symbols denote the following signals.

Symbol (11-a) denotes a frame signal for reproducing. Symbol (11-b) denotes an H.SW signal which controls the rotation of the head cylinder 106 and whose half cycle shows one track on the recording tape α. Symbol (11-c) denotes a reproducing head L or R of the head cylinder 106 switched by the switching means 105. Symbol (11-d) denotes a reproduction signal recorded in the recording tape a. Symbol (11-e) denotes a signal-processing H.SW signal that has the same cycle as the H.SW signal (11-b) synchronizing with the H.SW signal (11-b). In the case of this example, the H.SW signal (11-b) and signal-processing H.SW signal (11-e) are set to a cycle five times larger than that of the frame signal (11-a). Symbol (11-f) denotes an reproduced and amplified output supplied from the reproducing-amplifying means. Symbol (11-g) denotes a conceptual illustration of tracks and a frame recorded in the recording tape α.

FIG. 12 is an operational illustration under reproducing in the case of a compressibility constituted of five tracks per frame on a recording tape, in which symbols denote the following signals.

Symbol (12-a) denotes a frame signal for reproducing. Symbol (12-b) denotes an H.SW signal which controls the rotation of the head cylinder 106 and whose half cycle shows one track on the recording tape α. Symbol (12-c) denotes an H.SW2 signal for switching heads of the head cylinder 106. Symbol (12-d) denotes a reproducing head L or R' of the head cylinder 106 switched by the switching means 105.

Symbol (12-e) denotes a reproduction signal recorded in the recording tape α. Symbol (12-f) denotes a signal-processing H.SW signal that is set to the same cycle synchronizing with the H.SW signal (12-b). Moreover, in the case of this example, the H.SW signal (12-b) and signal-processing H.SW signal (12-f) are set to a cycle five times larger than that of the frame signal (12-a). Symbol (12-g) denotes a reproduced and amplified output supplied from the reproducing-amplifying means 114. Symbol (12-h) denotes a conceptual illustration of tracks and a frame recorded in the recording tape α.

Operations of the magnetic recording/reproducing apparatus having the above configuration are described below. In this case, the following two cases are described as examples: a case of realizing the operation for recording/reproducing a video input signal of the broadcasting mode NTSC in accordance with the track division of ten tracks per frame which is the standard of a general digital video signal and a case of realizing the operation for recording/reproducing the video input signal in accordance with the track division of five tracks per frame purposing long-time recording/reproducing.

First, the recording operation conforming to ten tracks per frame is described below. A video input signal supplied from an external unit is input to the analog-signal processing means 101 in which the pedestal level of the video input signal is fixed to a certain level to divide the signal into a brightness signal, a color signal, and a color-difference signal. Then, the video input signal to which the above processing is applied is converted to a digital signal. In this case, the analog-signal processing means 101 generates the frame signal (8-a) in accordance with the video input signal and supplies the signal (8-a) to the digital-signal processing means 102 and controlling means 107.

The frame signal (8-a) is generated to establish the operational timing between the digital-signal processing means 102 and analog-signal processing means 101 or the operational timing between a mechanism section (such as the switching means 105 or head cylinder 106) and the analog-signal processing means 101.

The controlling means 107 to which the frame signal (8-a) is input generates the signal-processing H.SW signal (8-b) showing the head switching timing of the head cylinder 106 in accordance with the frame signal (8-a) and supplies the signal (8-b) to the modulating means 103 in order to realize more minute timing control. Moreover, the controlling means 107 generates the H.SW signal (8-d) serving as a criterion of a head revolving speed and supplies the signal (8-d) to the head cylinder 106 and switching means 105. The H.SW signal (8-d) and signal-processing H.SW signal (8-b) are set to the same-cycle signals synchronizing with each other as described above. Frequencies (revolving speeds) of the signal-processing H.SW signal (8-b) and H.SW signal (8-d) will be described later.

A digital video signal output from the analog-signal processing means 101 is compressed and provided with an error correction code by the digital-signal processing means 102, and then modulated so as to have an energy distribution corresponding to the characteristic of the recording tape α by the modulating means 103.

In this case, the modulated output (8-c) which is an output of the modulating means 103 is set to an output corresponding to the cycle (frequency) of the frame signal (8-a). That is, in the case of the broadcasting mode NTSC, the frequency of the frame signal (8-a) becomes 29.97 Hz. Therefore, by setting frequency of the signal-processing H.SW signal (8-b) to 149.85 Hz which is a frequency five times larger than the frequency of the frame signal (8-a), the modulated output (8-c) is set to an output suitable for the track division of ten tracks per frame.

A recording current is set to the modulated output (8-c) so that the maximum performance of the recording tape α can be shown by the recording-amplifying means 104 and then the modulated output (8-c) is supplied to the switching means 105. The switching means 105 performs the following switching in accordance with the frequency of the H.SW signal (8-d). That is, the switching means 105 controls switching so as to alternately supply the modulated output (8-c) to the heads L and R (provided for the radius-directional both ends of the periphery of the head cylinder 106) as shown by the recording head (8-e). Moreover, the switching means 105 makes the switching cycle synchronize with the half cycle of the H.SW signal (8-d).

The above switching operation is performed by the switching means 105 and the revolving speed of the head cylinder 106 is made to synchronize with the H.SW signal (8-d). That is, the H.SW signal (8-d) serves as a rotational criterion of the head cylinder 106 and its half cycle corresponds to one track {recording assignment of one head L (R)}. By writing the modulated output (8-c) in the recording tape a under the above state, the output (8-c) is recorded in the recording tape a as the record signal (8-f) at a cycle five times larger than that of a video input signal.

Then, the recording operation at five tracks per frame is described below. A video input signal supplied from an external unit is input to the analog-signal processing means 101 in which the pedestal level of the video input signal is fixed to a certain level, and then divided into a brightness signal, a color signal, and a color-difference signal. Then, the video input signal to which the above processing is applied is converted to a digital signal. In this case, the analog-signal processing means 101 generates the frame signal (9-a) in accordance with the video input signal and supplies the signal (9-a) to the digital-signal processing means 102 and controlling means 107. The frame signal (9-a) is generated to establish the operational timing between the digital-signal processing means 102 and analog-signal processing means 101 or the operational timing between a mechanism section (such as the switching means 105 or head cylinder 106) and the analog-signal processing means 101.

To perform more minute timing control, the controlling means 107 to which the frame signal (9-a) is input generates the signal-processing H.SW signal (9-b) showing one track on the recording tape α of the head cylinder 106 in accordance with the frame signal (9-a) and supplies the signal (9-b) to the modulating means 103. Moreover, the controlling means 107 generates the H.SW signal (9-d) serving as the criterion of a head revolving speed and the H.SW2 signal (9-e) for switching heads of the head cylinder 106 and supplies the signals (9-d) and (9-e) to the head cylinder 106 and switching means 105. The H.SW signal (9-d), H.SW2 signal (9-e), and signal-processing H.SW signal (9-b) are set to the same-cycle signals synchronizing with each other as described above. Frequencies (revolving speeds) of the signal-processing H.SW signal (9-b), H.SW signal (9-d), and H.SW2 signal (9-e) will be described later.

A digital video signal output from the analog-signal processing means 101 is compressed and added with an error correction code by the digital-signal processing means 102 and then, modulated so as to have an energy distribution corresponding to the characteristic of the recording tape a by the modulating means 103.

In this case, the modulated output (9-c) which is an output of the modulating means 103 is set to an output corresponding to the cycle (frequency) of the frame signal (9-a). That is, in the case of the broadcasting mode NTSC, the frequency of the frame signal (9-a) becomes 29.97 Hz. Therefore, by setting the frequency of the signal-processing H.SW signal (9-b) to 149.85 Hz which is a frequency five times larger than that of the frame signal (9-a), the signal (9-b) is set to the modulated output (9-c) corresponding to only one of the first-half cycle and second-half cycle constituting one cycle of the signal-processing H.SW signal (9-b). The modulated output (9-c) thus generated becomes an output suitable for the track division of five tracks per frame.

The recording-amplifying means 104 sets a recording current to the modulated output (9-c) generated as described above. This setting is established so as to show the maximum performance of the recording tape α. After this setting is established, the modulated output (9-c) is supplied to the switching means 105. The switching means 105 performs the following switching in accordance with the frequency of the H.SW2 signal (9-e). That is, the switching means 105 controls switching so as to alternately supply the modulated output (9-c) to the heads L and R' (provided for the radius-directional one side of the periphery of the head cylinder 106) as shown by the recording head (9-f). Moreover, the means 105 makes the switching cycle synchronize with the half cycle of the SW2 signal (9-e).

The above switching operation is performed by the switching means 105 and the revolving speed of the head cylinder 106 is made to synchronize with the H.SW signal (9-d). That is, the H.SW signal (9-d) serves as a rotational criterion of the head cylinder 106 and one turn of the cylinder 106 corresponds to one track {recording assignment of one head L (R')}. One turn of a head of the head cylinder 106 corresponds to one track. Therefore, when recording all tracks by one head, adjacent tracks on the recording tape a may be simultaneously reproduced under reproducing and thus, one track cannot be correctly reproduced. Therefore, it is necessary to divide heads into L and R' and record data by providing an azimuth angle for each track. The H.SW2 signal (9-e) shows one turn of the head cylinder 106. Because one turn of the head cylinder 106 corresponds to one track, the tape feed rate is halved in order to equalize the track width on the recording tape a compared to the case of ten tracks per frame. Under the above state, the modulated output (9-c) is recorded in the recording tape a. Thereby, the modulated output (9-c) is recorded in the recording tape a as the record signal (9-g) at a cycle five times larger than that of a video input signal.

Moreover, there is another prior art for the recording operation, in which an output of the recording-amplifying means 104 is supplied to the head cylinder 106 without passing through the above conventional switching means 105. In this case, the modulated output (8-c) which is an output of the recording-amplifying means 104 is not alternately but simultaneously supplied to the heads L and R of the head cylinder 106 in accordance with the cycle of the H.SW signal (8-d) by the switching means 105. In this case, because the head cylinder 106 rotates, either of the heads L and R alternately contacts with the recording tape α. Thereby, the modulated output (8-c) is recorded as the record signal (8-f) at the cycle of a predetermined magnification (five times) of a video input signal similarly to the case of the above conventional example.

Then, the reproducing operation at ten tracks per frame is described below. The controlling means 115 generates the H.SW signals (11-e) and (11-b) respectively showing the head switch timing of the head cylinder 106 in accordance with the frame signal (11-a) generated inside or outside of a unit. Then, the means 115 supplies the H.SW signal (11-e) to the demodulating means 112 and the H.SW signal (11-b) to the head cylinder 106 and switching means 105. The heads L and R of the head cylinder 106 to be switched by the H.SW signal (11-b) operate like the reproducing head (11-c).

Under the above state, the record signal (8-f) of the recording tape α is reproduced by rotating the head cylinder 106. In this case, by making the revolving speed of the head cylinder 106 and the switching cycle of the switching means 105 synchronize with the H.SW signal (11-b), the record signal (8-f) is reproduced in its signal form. That is, as described above, the record signal (8-f) is recorded in the recording tape α as the track division of ten tracks per frame. Therefore, by converting the H.SW signal (11-b) to be supplied to the head cylinder 106 and switching means 105 into a signal having a cycle [149.85 Hz in the case of the broadcasting mode NTSC] five times larger than the cycle of the frame signal (11-a) [29.94 Hz in the case of the broadcasting mode NTSC], the record signal (8-f) is reproduced in a state suitable for the track division (ten tracks per frame) of the signal (8-f) and the reproduction signal (11-d) is supplied to the reproducing-amplifying means 111.

The reproducing-amplifying means 111 amplifies the reproduction signal (11-d) and then, supplies the reproduced and amplified output (11-f) of the signal (11-d) to the demodulating means 112. The demodulating means 112 demodulates the data modulated in accordance with the characteristic of the recording tape α under recording and supplies it to the digital-signal processing means 113. In this case, the demodulating means 112 generates a demodulated output by relating the output to the signal-processing H.SW signal (11-e) [same-cycle signal synchronizing with the H.SW signal (10-b)] and thereby, converts the demodulated output into a signal form of the track division of ten tracks per frame correspondingly to the cycle of the frame signal (11-a).

The digital-signal processing means 113 error-corrects and error-revises a received demodulated output and extends compressed data to supply them to the analog-signal processing means 114. In this case, the digital-signal processing means 113 processes a signal synchronously with the frame signal (11-a) supplied from the controlling means 115.

The analog-signal processing means 114 converts a received output of the digital-signal processing means 113 to an analog signal and outputs the analog signal to a unit outside of the apparatus as a reproduced video signal.

Then, the reproducing operation at five tracks per frame is described below. The controlling means 115 generates the signal-processing signal H.SW signal (12-f) serving as one track on the recording tape of the head cylinder 106, the H.SW signal (12-b) serving as the criterion of a head revolving speed, and the H.SW2 signal (12-c) for switching heads of the head cylinder 106 in accordance with the frame signal (12-a) generated inside or outside of a unit. Then, the means 115 supplies the signal-processing H.SW signal (12-f) to the demodulating means 112, the H.SW signal (12-b) to the head cylinder 106, and the H.SW2 signal (12-c) to the switching means 105. The heads L and R' of the head cylinder 106 to be switched by the H.SW2 signal (12-c) operate like the reproducing head (12-d). In this case, the tape feed rate is set to ½ the case of ten tracks per frame.

Under the above state, the record signal (9-g) of the recording tape α is reproduced by rotating the head cylinder

106. In this case, the record signal (9-g) is reproduced in its signal form by making the revolving speed of the head cylinder 106 synchronize with the H.SW signal (12-b) and the switching cycle of the switching means 105 synchronize with the H.SW2 signal (12-c). That is, as described above, the record signal (9-g) is recorded in the recording tape α in the form of the track division of five tracks per frame. Therefore, by converting the H.SW signal (12-b) to be supplied to the head cylinder 106 to a signal having a cycle (149.85 Hz in the case of the broadcasting mode NTSC) five times larger than the cycle [29.94 Hz in the case of the broadcasting mode NTSC] of the frame signal (12-a) and generating the H.SW2 signal (12-c) using the switching cycle of the switching means 105 as the one-turn cycle of the head cylinder 106, the record signal (9-g) is reproduced in a state suitable for the track division (five tracks per frame) of the signal (9-g) and the reproduction signal (12-e) is supplied to the reproducing-amplifying means 111.

The reproducing-amplifying means 111 amplifies the input reproduction signal (12-e) and then supplies the reproduced and amplified output (12-g) to the demodulating means 112.

The demodulating means 112 demodulates the data modulated in accordance with the characteristic of the recording tape α under recording and supplies it to the digital-signal processing means 113. In this case, the demodulating means 112 generates a demodulated output correspondingly to the signal-processing H.SW signal (12-f) and thereby, converts the demodulated output to a signal form of the track division of five tracks per frame correspondingly to the cycle of the frame signal (12-a).

The digital-signal processing means 113 error-corrects and error-revises a received demodulated output and extends compressed data to supply them to the analog-signal processing means 114. In this case, the digital-signal processing means 113 processes a signal synchronously with the frame signal (12-a) supplied from the controlling means 115.

The analog-signal processing means 114 converts a received output of the digital-signal processing means 113 to an analog signal and outputs the signal to a unit outside of the apparatus as a reproduced video signal.

A magnetic recording/reproducing apparatus operating as described above has the following problem. That is, as described above, the head configuration of the head cylinder 106 cannot be equalized in the case of recording and generating data in accordance with the track division of ten tracks per frame and in the case of recording and reproducing data in accordance with the track division of ten tracks per frame at further-improved compressibility and therefore, it is necessary to prepare a head corresponding to each case. Moreover, it is necessary to switch tape feed rates and thereby, a configuration of the magnetic recording/reproducing apparatus is complicated and the fabrication cost is increased.

Furthermore, it is necessary to rotate the head cylinder 106 at a high speed of 149.85 Hz. However, to accurately keep the high-speed rotation of the head cylinder 106, a high-accuracy mechanism is necessary and thereby, the fabrication cost of a magnetic recording/reproducing apparatus is increased.

Furthermore, to accurately keep a mechanism for supporting the high-speed head cylinder 106, it is inevitable to require a lot of time for maintenance under operation and this causes the running cost of a magnetic recording/reproducing apparatus to increase.

As described above, because a conventional magnetic recording/reproducing apparatus is expensive, an inexpensive magnetic recording/reproducing apparatus realizing digital recording and reproducing is requested.

SUMMARY OF THE INVENTION

Object:

Correspondingly to the above request, it is an object of the present invention to provide a magnetic recording/reproducing apparatus allowing the same head cylinder and the same tape feed rate to be used for track divisions different from each other in compressibility (ten tracks per frame and five tracks per frame) and thereby having a simple structure and capable of decreasing the fabrication cost.

DISCLOSURE OF THE INVENTION

The present invention uses a magnetic recording/reproducing apparatus which comprises input-signal converting means for converting an input signal to a record signal through modulation performed at the timing corresponding to the previously-specified number of tacks per division of signal, recording-rate adjusting means for adjusting the recording rate of the record signal so as to lower, and recording means for rotating a head cylinder at a revolving speed lower than a head-cylinder revolving speed corresponding to the timing of the modulation and corresponding to a recording rate adjusted by the recording-rate adjusting means to record the record signal after the recording rate is adjusted in a recording tape and thereby, operates as described below.

Because a recording rate under recording is lowered, it is possible to use a recording tape having the lowered recording rate and record data with the same head configuration and the same head-cylinder revolving speed even if the number of tracks per frame differs due to the difference in compressibility.

The accuracy of a mechanism for rotating a head cylinder depends on a head revolving speed. Therefore, in the case of a configuration of the present invention for making the revolving speed of a head cylinder lower than the revolving speed specified to generate a record signal, an accuracy requested to the above rotational mechanism is lowered by the value equivalent to the decrement of the accuracy. Therefore, the present invention makes it possible to lower the accuracy of the mechanism for rotating the head cylinder by the value and cut the cost.

In order to rotate the head cylinder at a high rotation, it has been necessary to conduct periodic maintenance, but the present invention does not require such a high precision maintenance because the revolving speed of the head cylinder is set lower than the rotation number corresponding to the modulation, which also results in enabling cost cutting.

The present invention uses a magnetic recording/reproducing apparatus obtained by improving the above magnetic recording/reproducing apparatus, which further comprises reproducing means for reproducing the record signal recorded in the recording tape by rotating a head cylinder at a head revolving speed set by the recording means, reproduced-rate adjusting means for adjusting the reproducing rate of a reproduction signal output from the reproducing means so as to rise up to a rate suitable for the modulation performed at the timing corresponding to the previously-specified number of tracks per division of signal, and output-signal converting means for converting the reproduction signal whose reproducing rate is adjusted by the reproducing-rate adjusting means to an output signal through the demodulation performed at the timing corresponding to the previously-specified number of tracks per division of signal and thereby, operates as described below.

The configuration of the present invention makes it possible to accurately reproduce a record signal recorded in a recording tape. Moreover, because the reproducing rate under reproducing is lowered, it is possible to use a recording tape having the lowered recording rate. Moreover, it is possible to reproduce data by the same head configuration and the same head-cylinder revolving speed even if the number of tracks per division of signal differs due to the difference in compressibility.

Furthermore, by making the revolving speed of a head cylinder lower than the revolving speed specified when generating a record signal or an output signal, it is possible to lower the accuracy requested to the rotational mechanism of the head cylinder by a value equivalent to the decrement of the revolving speed. Therefore, it is possible to cut the cost by lowering the accuracy of the mechanism for rotating the head cylinder or by simplifying the maintenance of the head cylinder.

According to the above improved magnetic recording/reproducing apparatus of the present invention, the recording means keeps the revolving speed of the head cylinder constant even if the previously-specified number of tracks per division of signal differs due to the difference in compressibility of the record signal. Thereby, the apparatus operates as described below.

Even if the number of tracks per division of signal differs due to the difference in compressibility, the revolving speed of a head cylinder is kept constant. Therefore, it is possible to simplify structures of the rotational mechanism and controlling section of the head cylinder. Therefore, it is possible to reduce the cost of the apparatus by a value equivalent to the simplification of the structures.

Moreover, in the above improved magnetic recording/reproducing apparatus of the present invention, the recording means makes the configuration of the head cylinder same even if the previously-specified number of tracks per division of signal differs due to the difference in compressibility of the record signal. Thereby, the apparatus operates as described below.

Even if the number of tracks per division of signal differs due to the difference in compressibility, it is possible to simplify the head configuration because the same head configuration is used. Therefore, it is possible to reduce the cost of the apparatus by a value equivalent to the case of using the same configuration.

In the above improved magnetic recording/reproducing apparatus of the present invention, the recording means adjusts the feed rate of a recording tape under recording correspondingly to a set head-cylinder revolving speed. Thereby, the apparatus operates as described below.

Even if the number of tracks per division of signal differs due to the difference in compressibility, it is possible to simplify the same tape feed rate, tape feed mechanism, and control. Therefore, it is possible to reduce the cost of the apparatus by a value equivalent to the simplification of the configuration.

Moreover, by lowering the revolving speed of a head cylinder while keeping a tape feed rate constant, the interval between recording tracks formed on a recording tape (interval between recording tracks adjacent to each other in the longitudinal direction of the tape) becomes excessively wide and thereby, a trouble occurs that the operating efficiency of the tape is deteriorated because the length of the tape required for recording increases. In the case of the present invention, however, even if the revolving speed of a head cylinder lowers, it is possible to prevent the above trouble from occurring by adjusting (reducing) a tape feed rate correspondingly to the lowered revolving speed.

In the above improved magnetic recording/reproducing apparatus of the present invention, the reproducing means keeps the revolving speed of the head cylinder constant even if the previously-specified number of tracks per division of signal differs due to the difference in compressibility. Thereby, the apparatus operates as described below.

Even if the number of tracks per division of signal differs due to the difference in compressibility, a configuration of the present invention for keeping the revolving speed of a head cylinder makes it possible to simplify configurations of the rotational mechanism and control section of the head cylinder. Therefore, it is possible to reduce the cost of the apparatus by a value equivalent to the simplification of the configurations.

In the above improved magnetic recording/reproducing apparatus of the present invention, the reproducing means uses the same configuration of the head cylinder even if the previously-specified number of tracks per division of signal differs due the difference in compressibility. Thereby, the apparatus operates as described below.

Even if the number of tracks per division of signal differs due to the difference in compressibility, the configuration of the present invention using the same head configuration makes it possible to simplify the head configuration. Therefore, it is possible to reduce the cost of the apparatus by a value equivalent to the simplification of the configuration.

In the above improved magnetic recording/reproducing apparatus of the present invention, the recording means sets the revolving speed of a head cylinder so that the one division of signal is divided into the reduced number of tracks set by dividing the previously-specified number of tracks per division of signal by an integer smaller than the previously-specified number of tracks. Thereby, the apparatus operates as described below.

Recording tracks constituting one division of signal are respectively divided into an integral number of track division areas on a recording tape. Then, signal areas of record signals generated so as to be distributed every recording track are recorded and arranged in each track division area constituting each recording track. Therefore, the record signals are accurately distributed to track division areas on the recording tape and recorded in the tape and it is possible to keep the recording accuracy in a preferable state.

In the above improved magnetic recording/reproducing apparatus of the present invention, the reproducing means adjusts the feed rate of a recording tape under reproducing in accordance with a set head-cylinder revolving speed. Thereby, the apparatus operates as described below.

It is possible to accurately reproduce a record signal recorded in a recording tape by a magnetic recording/reproducing apparatus of the present invention.

In the above improved magnetic recording/reproducing apparatus of the present invention, the recording-rate converting means has first storing means, write controlling means for writing the record signal in the first storing means at the write timing corresponding to the previously-specified number of tracks per division of signal, and first read controlling means for reading the record signal from the first storing means at the read timing corresponding to the reduced number of tracks and supplying the signal to the recording means. Thereby, the apparatus operates as described below.

In the case of the present invention, the revolving speed of a head cylinder assumed by input-signal converting means is different from the revolving speed of a head cylinder actually recorded by recording means. Therefore, to accurately send a record signal generated by the input-signal converting means to the recording means and record the signal in a recording tape, it is necessary to adjust the timing for outputting the record signal from the input-signal converting means and the timing for inputting the record signal to the recording means separately from each other. Therefore, first storing means serving as a buffer memory is set between the input-signal converting means and the recording means and the timing for writing the record signal in the first storing means (timing to be controlled by the first write controlling means) is used as the write timing corresponding to the previously-specified number of tracks per division of signal. Moreover, the timing for reading the record signal from the first storing means (timing for performing control by the first read-controlling means) is used as the read timing corresponding to the reduced number of tracks. Thereby, it is possible to accurately transfer the record signal between the input-signal converting means and the recording means.

It is preferable to constitute the first read controlling means so as to lower a recording rate by reading the record signal from the first storing means at a read clock rate lower than the write clock rate of the first storing means.

In the above improved magnetic recording/reproducing apparatus of the present invention, the first write controlling means fine controls the write timing. Thereby, the apparatus operates as described below.

By fine controlling the write timing by the first write controlling means, it is possible to optionally adjust the position of a track division area formed on a recording tape (position of track division area on recording track, showing data position). Therefore, it is possible to arrange data on the recording tape so that the data can be easily obtained even under the search operation in which the on-track phenomenon does not occur when reproducing the recording tape.

In the above improved magnetic recording/reproducing apparatus of the present invention, the first read controlling means fine controls the read timing. Thereby, the apparatus operates as descried below.

By fine controlling the read timing by the first read controlling means, it is possible to optionally adjust the position (data position) of a track division area formed on a recording tape. Therefore, it is possible to arrange data on a recording track so that the data can be easily obtained even under the search operation in which the on-track phenomenon does not occur when reproducing the recording tape.

In the above improved magnetic recording/reproducing apparatus of the present invention, the reproducing-rate converting means has second storing means, second write controlling means for the reproduction signal in the second storing means at the timing corresponding to the reduced number of tracks, and second read controlling means for reading the reproduction signal from the second storing means at the read timing corresponding to the previously-specified number of tracks per division of signal and supplying the signal to the output-signal converting means. Thereby, the apparatus operates as described below.

In the case of the present invention, the revolving speed of a head cylinder assumed by the output-signal converting means is different from that of a head cylinder for actually reproducing data by the reproducing means. Therefore, to accurately send a reproduced output reproduced by the reproducing means to the output-signal converting means and convert the output to an output signal, it is necessary to adjust the timing for outputting a reproduction signal reproduced by the reproducing means and the timing for inputting the reproduction signal to the output-signal converting means separately from each other. Therefore, second storing means serving as a buffer memory is set between the reproducing means and the output-signal converting means and use the timing for writing the reproduction signal in the second storing means (timing for performing control by second write controlling means) as the write timing corresponding to the reduced number of tracks. Moreover, the timing for reading the reproduction signal from the second storing means (timing for performing control by second read controlling means) as the read timing corresponding to the previously-specified number of tracks per division of signal. Thereby, it is possible to accurately transfer the reproduction signal between the reproducing means and the output-signal converting means.

It is preferable to constitute the second read controlling means so as to raise a recording rate by reading the reproduction signal from the second storing means at a read clock rate higher than a write clock rate to the second storing means.

In the above improved magnetic recording/reproducing apparatus of the present invention, the second write controlling means fine adjusts the write timing. Thereby, the apparatus operates as described below.

By fine adjusting the write timing by the second write controlling means, it is possible to return a recording track on a recording tape fine-adjusted for recording to the original timing and supply the timing to the output-signal converting means. Therefore, it is possible to realize data arrangement on a recording track from which data can be easily obtained under the search operation in which the on-track phenomenon does not occur when reproducing a recording track on the recording tape.

In the above improved magnetic recording/reproducing apparatus of the present invention, the second read controlling means fine adjusts the read timing. Thereby, the apparatus operates as described below.

By fine adjusting the read timing by the second read controlling means, it is possible to return a recording track on a recording tape fine adjusted for recording to the original timing and supply the timing to the output-signal converting means. Therefore, it is possible to realize data arrangement on a recording track from which data can be easily obtained under the search operation in which the on-track phenomenon does not occur when reproducing a recording track on the recording tape.

In the above improved magnetic recording/reproducing apparatus of the present invention, the input-signal converting means selectively fetches an input signal of one signal division every a plurality of signal divisions and converts the signal to a record signal. Thereby, the apparatus operates as described below.

It is possible to realize long-time recording/reproducing such as frame-omitted recording/reproducing.

In the above improved magnetic recording/reproducing apparatus of the present invention, the recording means records the record signal in the recording tape while lowering the recording rate of the record signal. Thereby, the apparatus operates as described below.

Because the recording rate under recording can be lowered, it is possible to use a recording tape having the lowered recording rate.

In the above improved magnetic recording/reproducing apparatus of the present invention, the output-signal converting means returns the recording rate lowered by the recording means to the original recording rate when converting the reproduction signal to the output signal. Thereby, the apparatus operates as described below.

By returning the recording rate to the original value, it is possible to generate an output signal having the same signal form as an input signal.

BRIEF DESCRIPTION OF THE DRAWINGS

FIG. 1 is a block diagram necessary for recording by a magnetic recording/reproducing apparatus of an embodiment of the present invention;

BEST MODE FOR CARRYING OUT THE INVENTION

A best embodiment of the present invention is described below by referring to FIG. 1.

Figure 2:
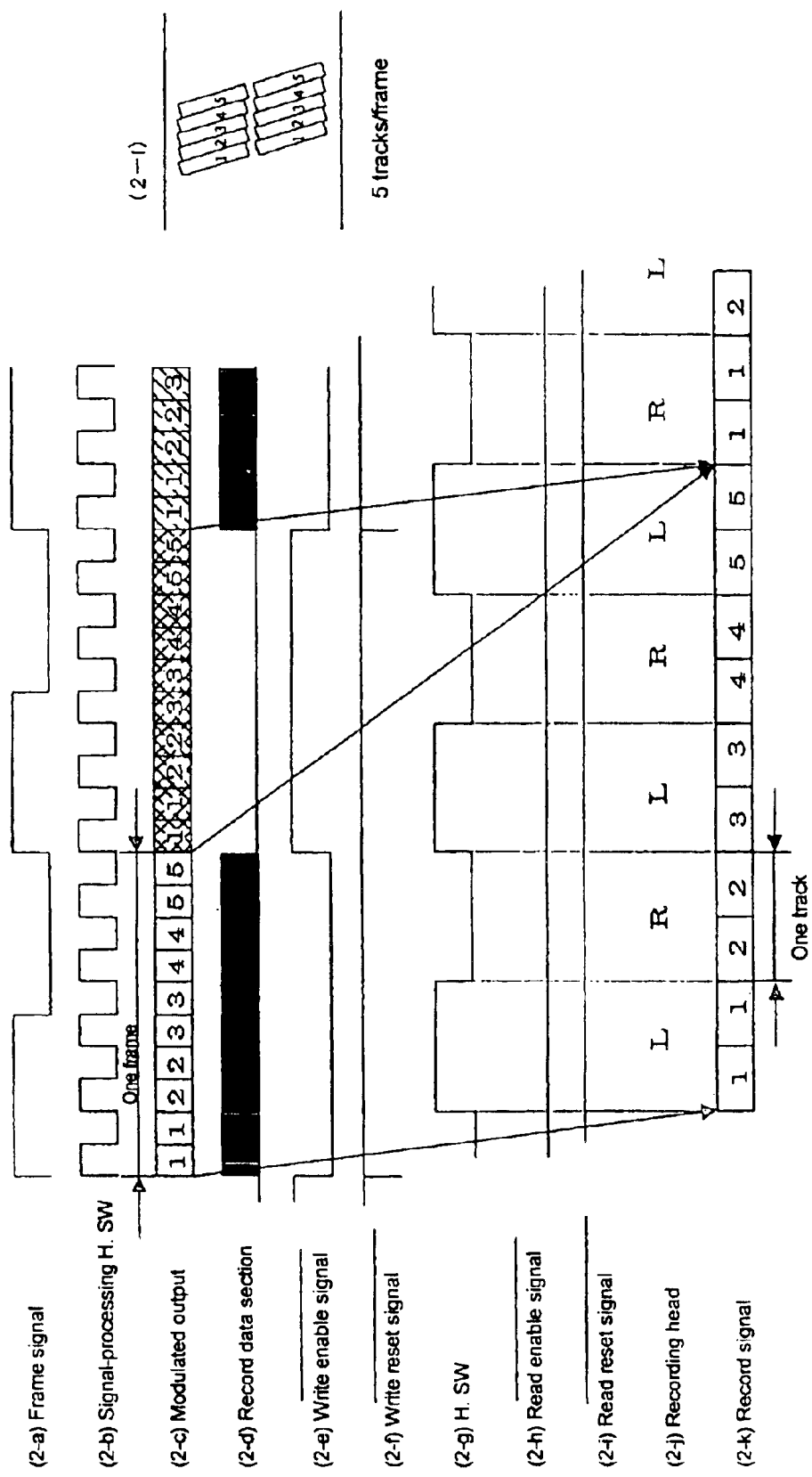
FIG. 2 is a time chart for explaining operations of an embodiment under recording at ten tracks per frame.
Figure 3:
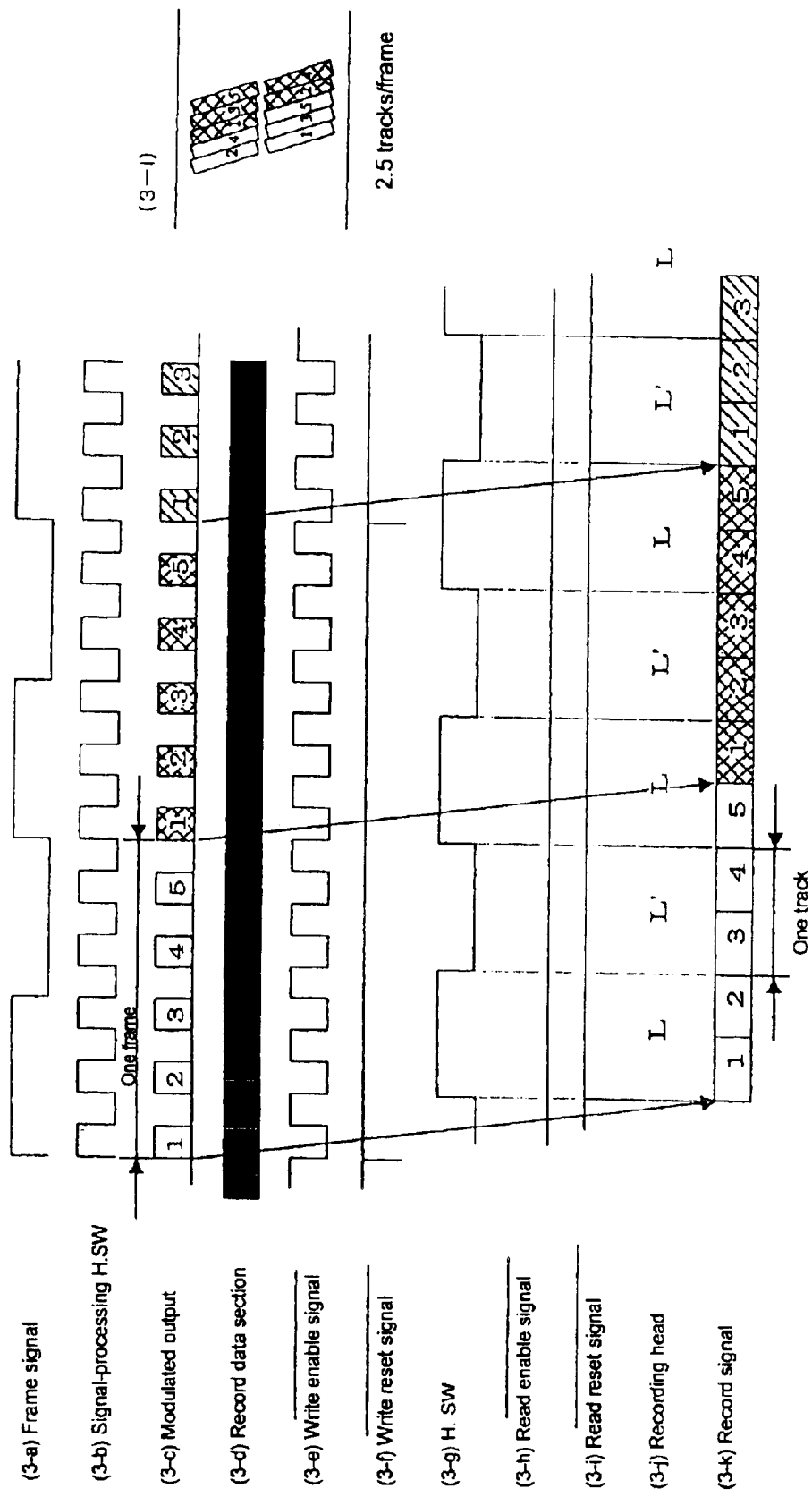
FIG. 3 is a time chart for explaining operations of an embodiment under recording at five tracks per frame.
Figure 4:
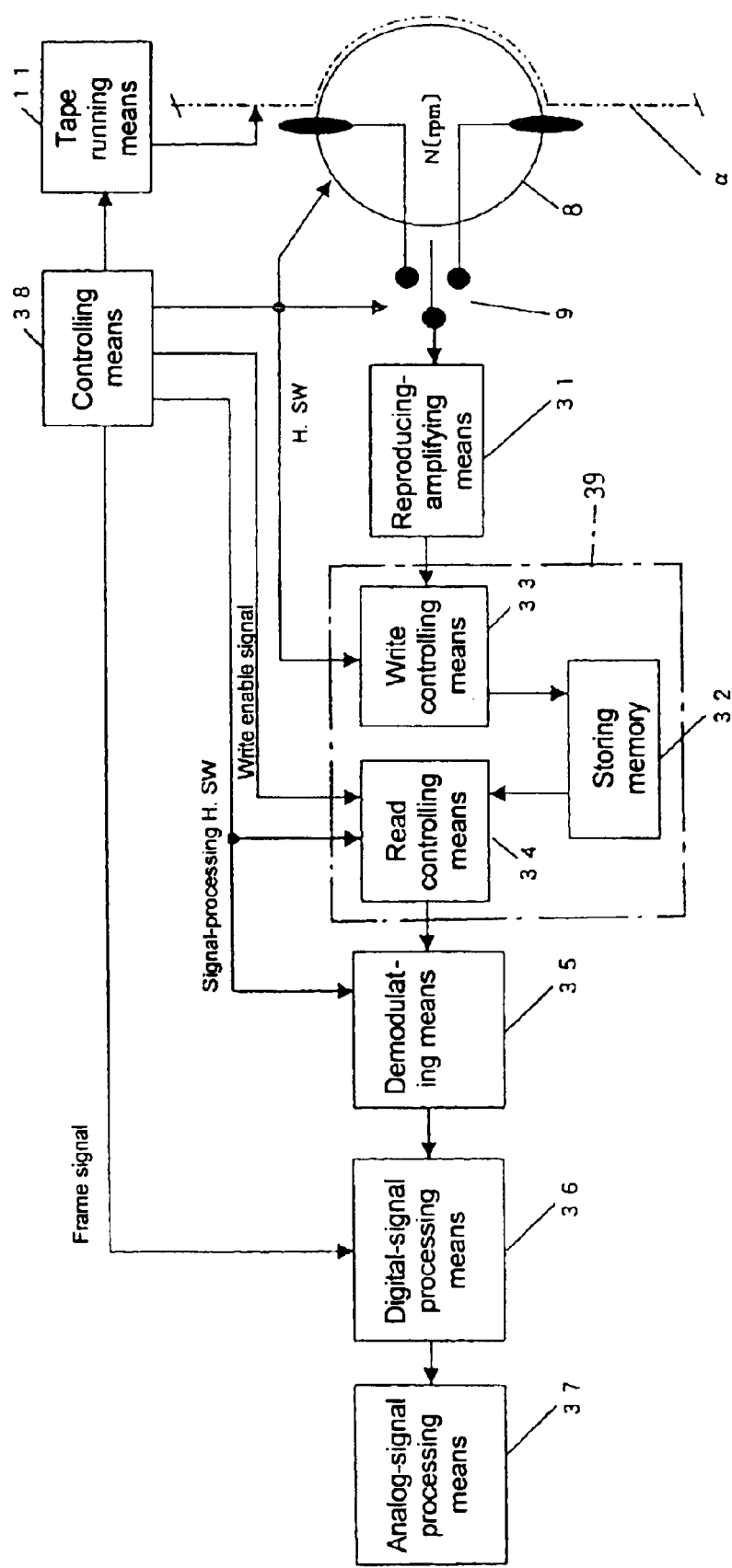
FIG. 4 is a block diagram necessary for reproducing by a recording/reproducing apparatus of an embodiment.
Figure 5:
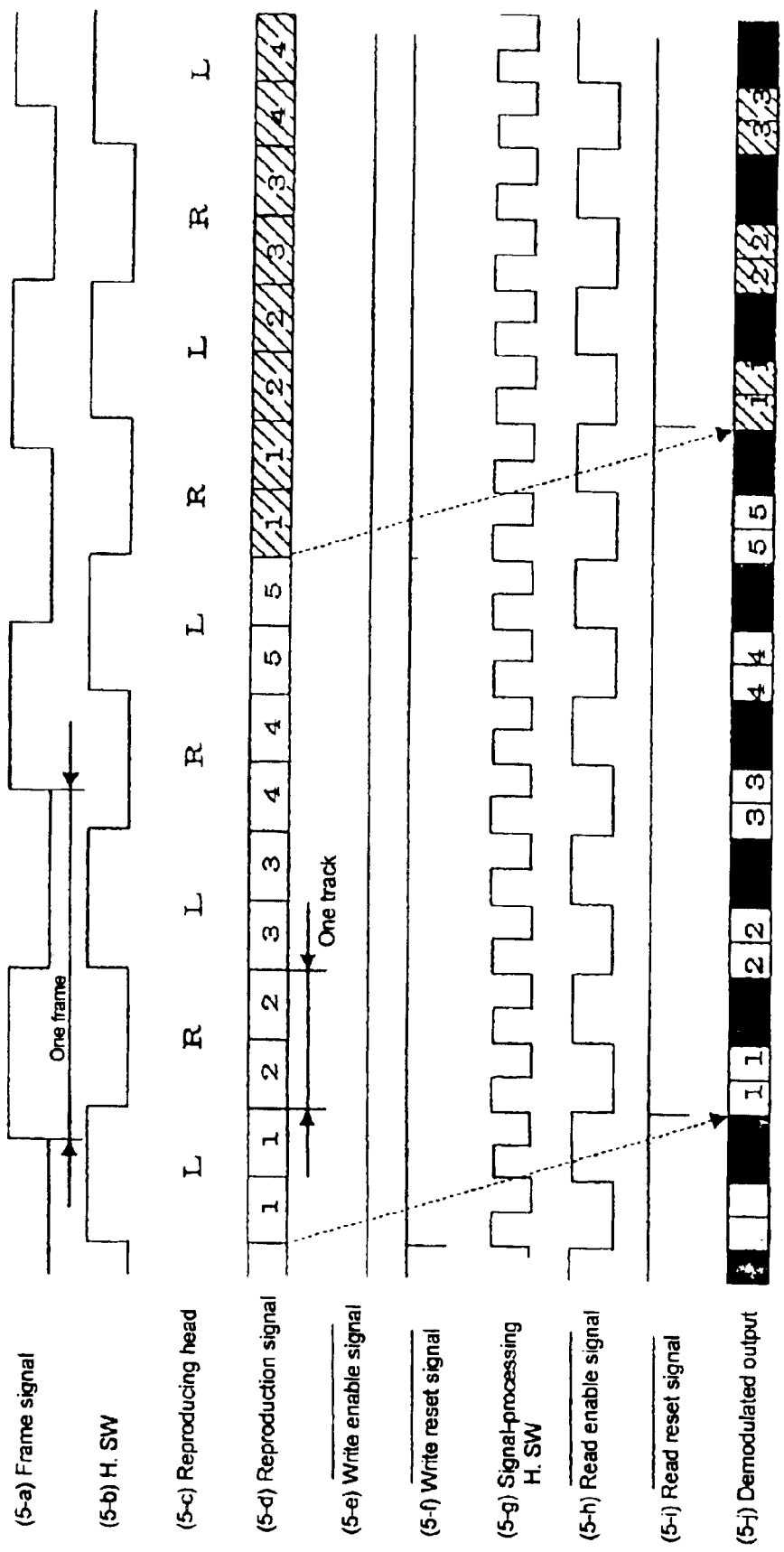
FIG. 5 is a time chart for explaining operations of an embodiment under reproducing at ten tracks per frame.
Figure 6:
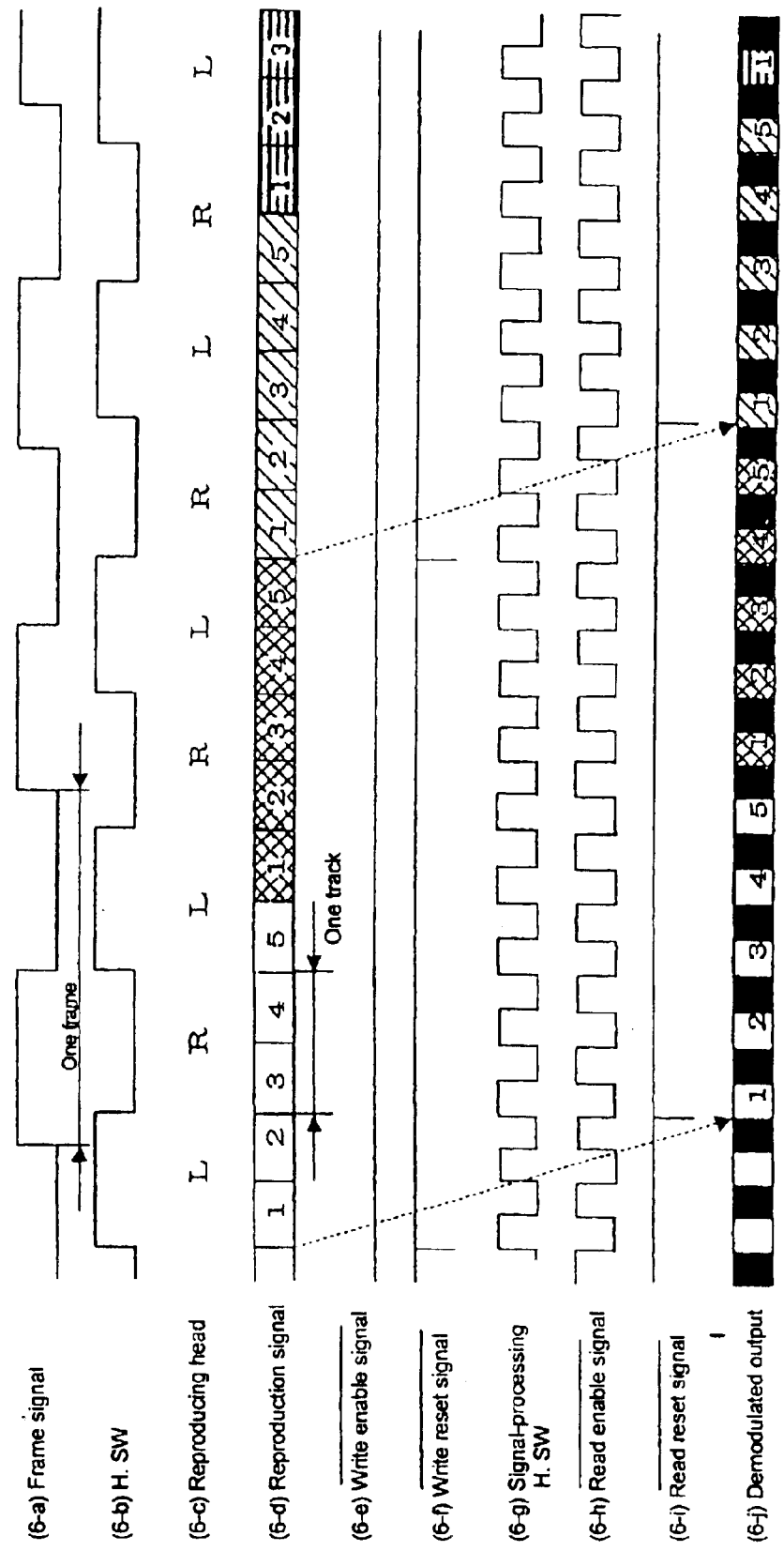
FIG. 6 is a time chart for explaining operations of an embodiment under reproducing at five tracks per frame.
Figure 7:
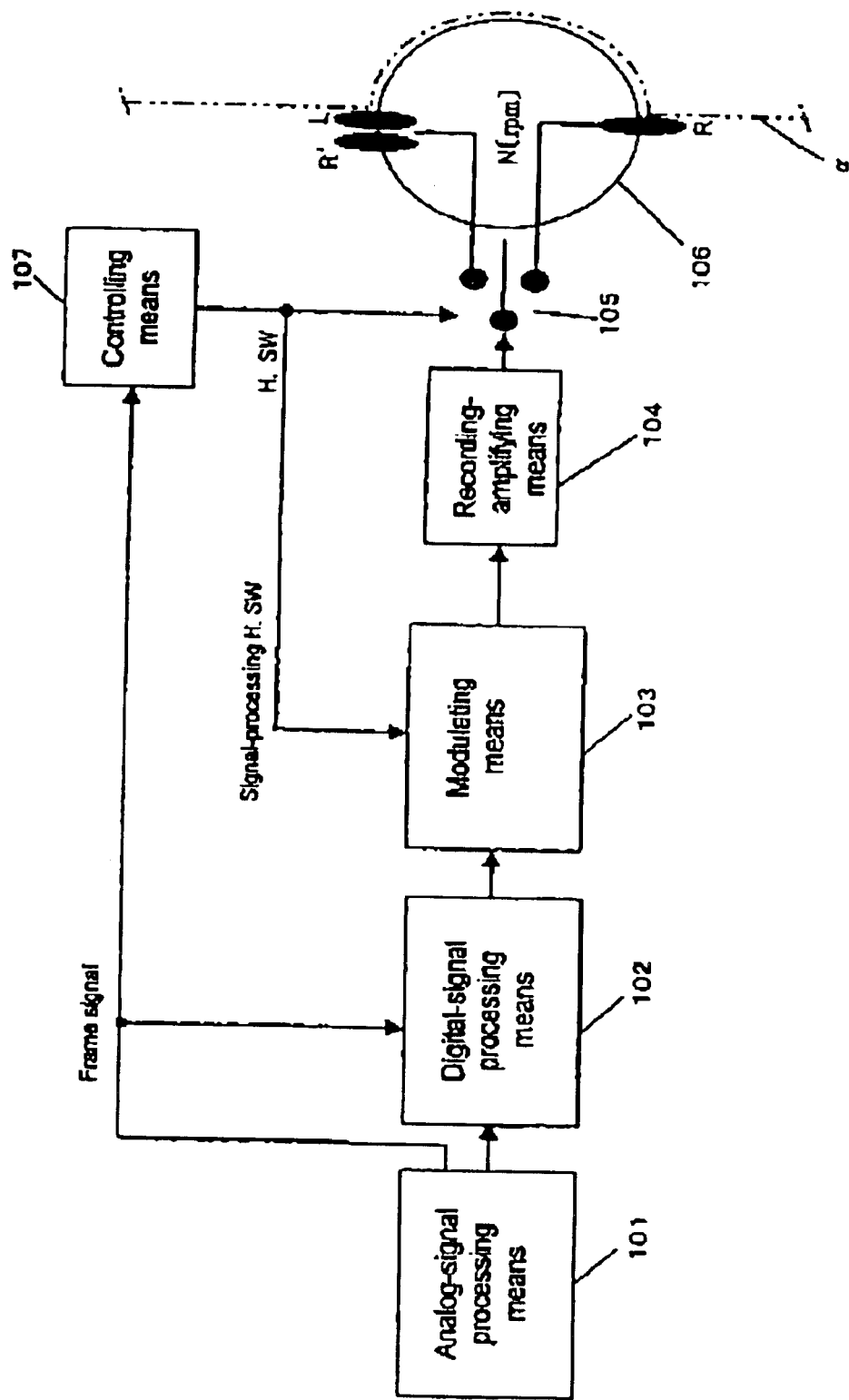
FIG. 7 is a block diagram necessary for recording by a conventional magnetic recording/reproducing apparatus which is a conventional example.
Figure 8:
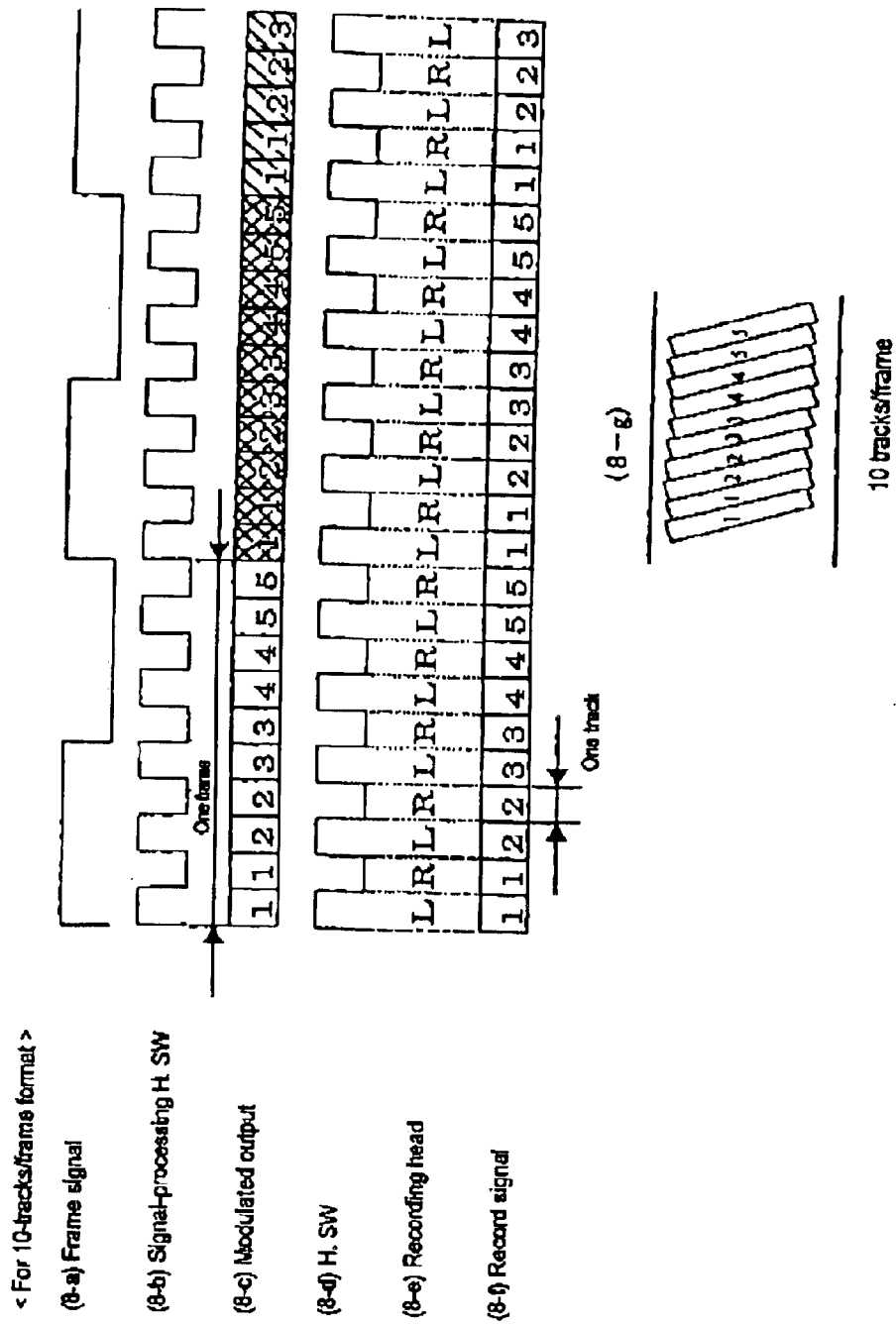
FIG. 8 is a time chart for explaining operations of a conventional example under recording at ten tracks per frame.
Figure 9:
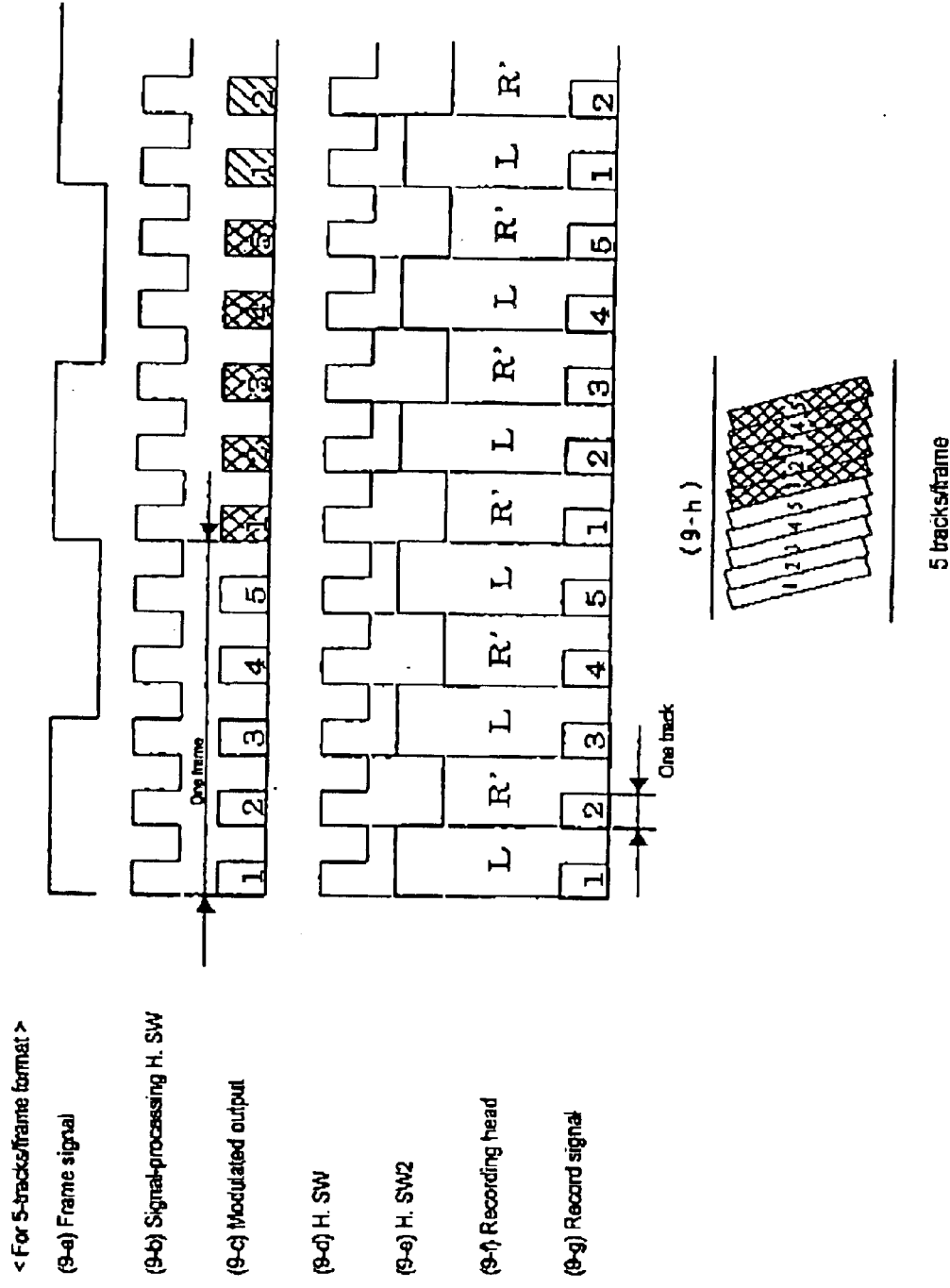
FIG. 9 is a time chart for explaining operations of a conventional example under recording at five tracks per frame.
Figure 10:
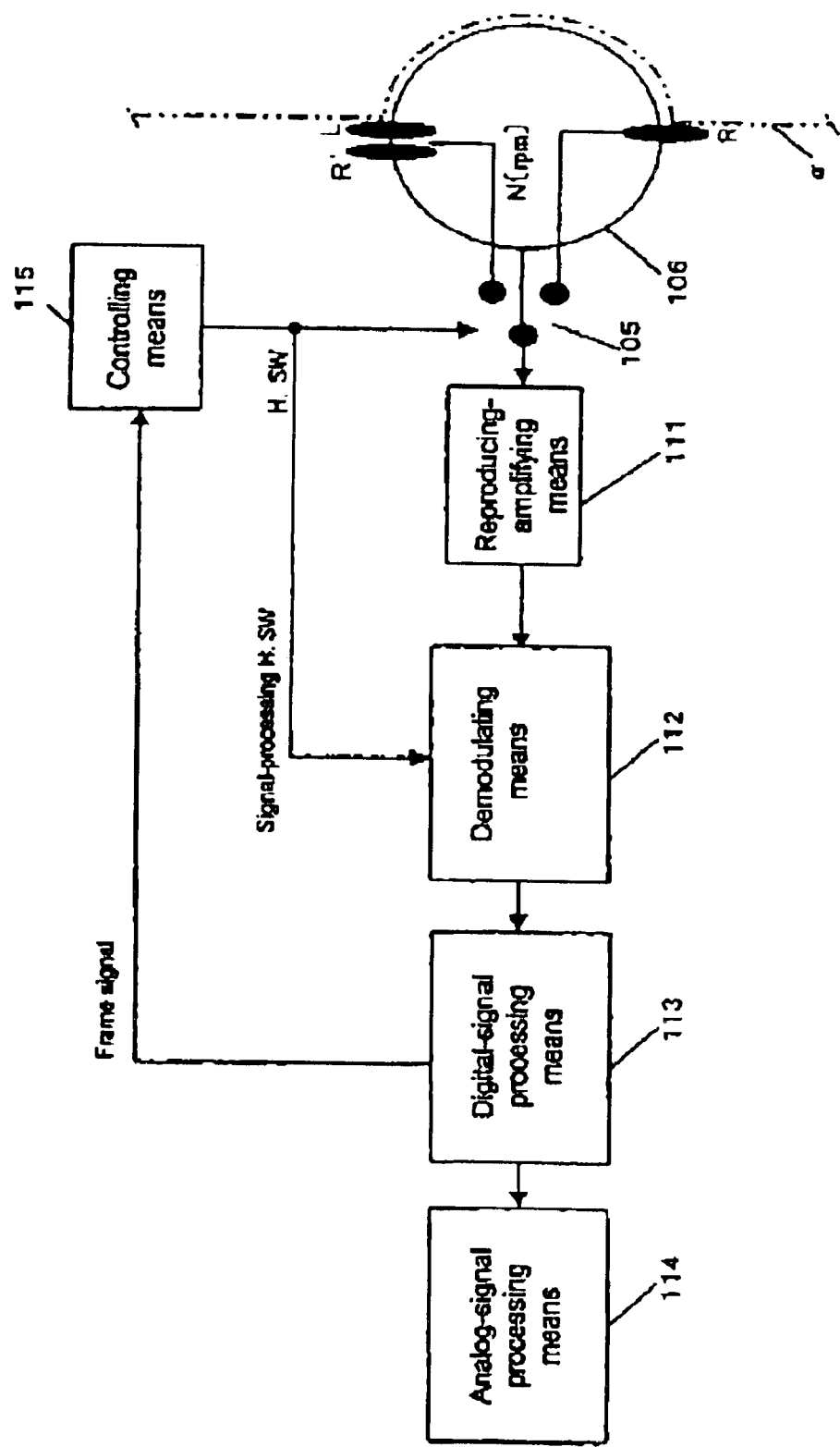
FIG. 10 is a block diagram necessary for reproducing by a conventional example.
Figure 11:
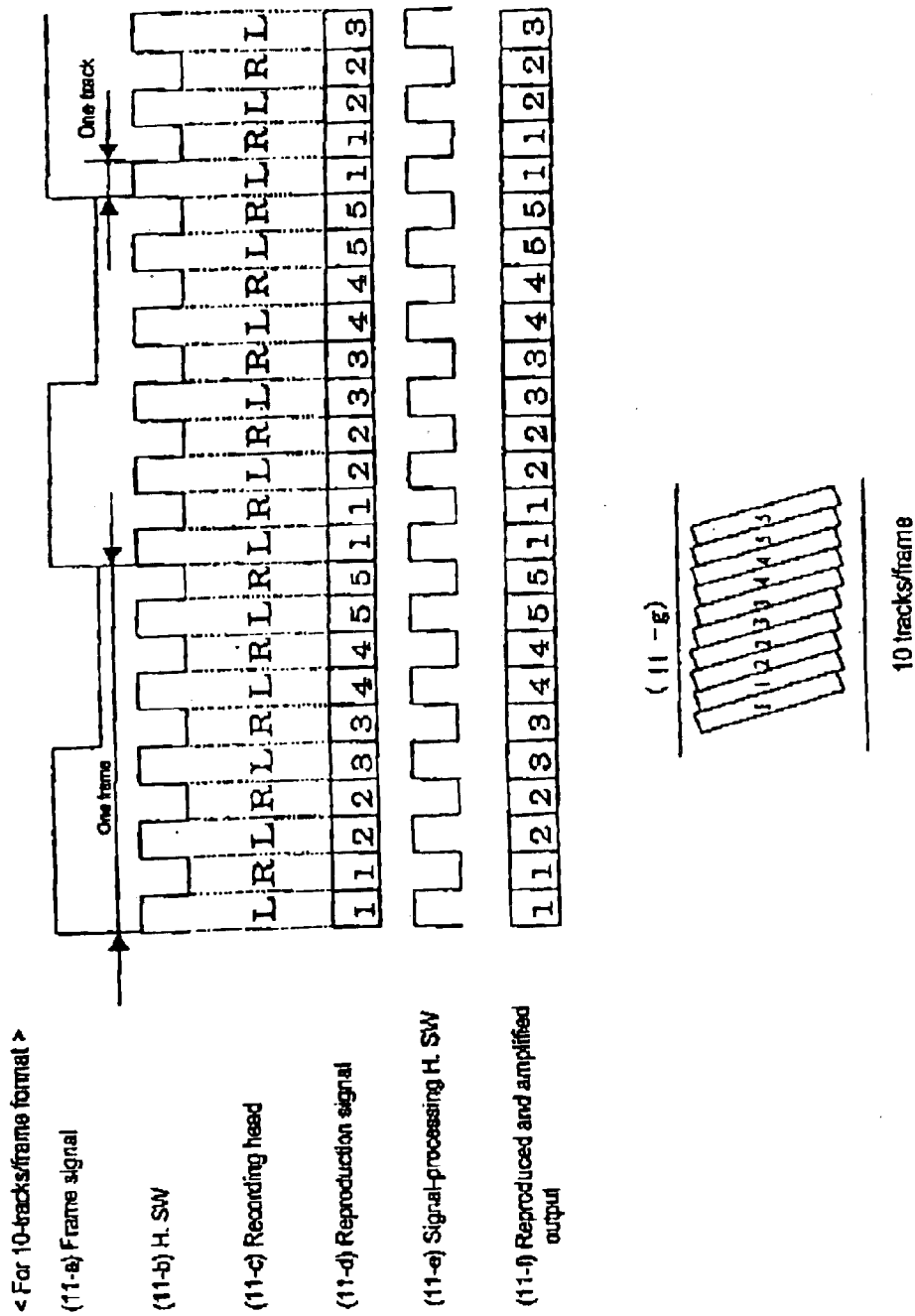
FIG. 11 is a time chart for explaining operations of a conventional example under reproducing at ten tracks per frame.
Figure 12:
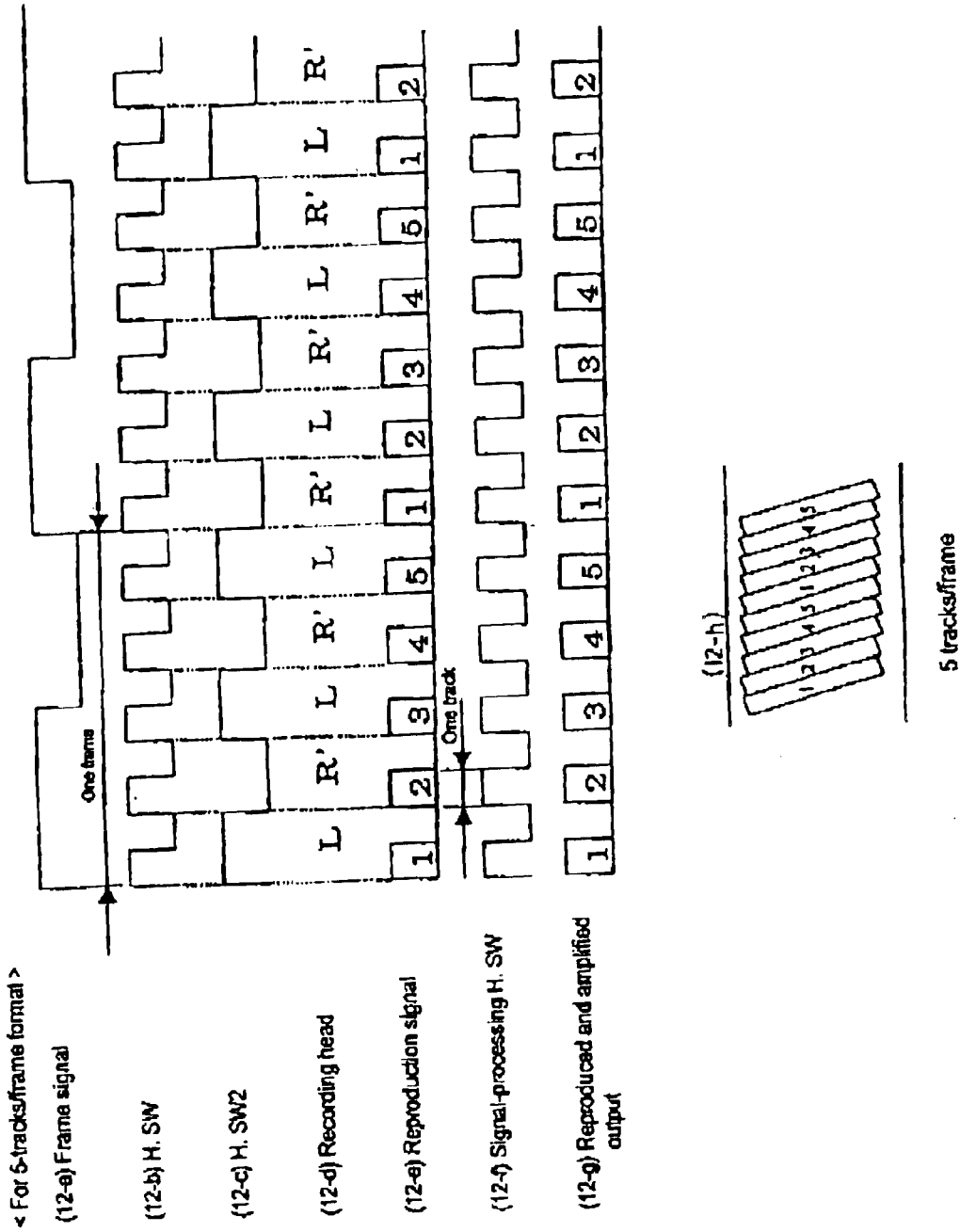
FIG. 12 is a time chart for explaining operations of a conventional example under reproducing at five tracks per frame.

FIG. 1 shows a configuration necessary for recording by a magnetic recording/reproducing apparatus of an embodiment of the present invention, FIG. 2 shows an operational illustration under recording at a compressibility of ten tracks per frame, FIG. 3 shows an operational illustration for recording at a compressibility of five tracks per frame, FIG. 4 shows a configuration necessary for reproducing by the magnetic recording/reproducing apparatus of the embodiment in FIG. 1, FIG. 5 shows an operational illustration for reproducing at a compressibility of ten tracks per frame on a recording tape α, and FIG. 6 shows an operational illustration for reproducing at a compressibility of five tracks per frame on the recording tape α.

The configuration of the magnetic recording/reproducing apparatus of this embodiment required to record data in the recording tape α is provided with analog-signal processing means 1, digital-signal processing means 2, modulating means 3, recording-rate adjusting means 12, recording-amplifying means 7, a head cylinder 8, switching means 9, controlling means 10, and tape running means 11.

The analog-signal processing means 1 applies analog processing and digital conversion to a received video input signal. The digital-signal processing means 2 compresses the data digitized by the analog-signal processing means 1 and adds an error correction code to the data. The modulating means 3 modulates the digital data compressed and added with an error correction code in order to record the data in the recording tape α. The recording-rate adjusting means 12 adjusts a modulated signal output from the modulating means 3 so as to lower the recording rate of the signal. The recording-amplifying means 7 amplifies the modulated output whose recording rate is adjusted by the recording-rate adjusting means 12. The head cylinder 8 records an output of the recording-amplifying means 7 in the recording tape α. The switching means 9 switches which to supply an output of the recording-amplifying means 7, right or left head of the head cylinder 8. The controlling means 10 controls recording of various signals. The tape running means 11 controls running of the recording tape α under recording.

The recording-rate adjusting means 12 is provided with a storing memory 4, write controlling means 5, and read controlling means 6. A modulated signal output from the modulating means 3 is written in and read out of the storing memory 4. The write controlling means 5 controls the write operation of the storing memory 4. The read controlling means 6 controls the read operation of the storing memory 4. The controlling means 10 controls the revolving speed of the head cylinder 8 to an optional revolving speed.

In FIG. 2, symbols denote the following signals. Symbol (2-a) a frame signal included in a video input signal. Symbol (2-b) denotes a signal-processing H.SW signal for recording data in the recording tape α synchronously with the frame signal (2-a). Symbol (2-c) denotes an output (modulated output) of the modulating means 3. Symbol (2-d) denotes a record data section showing a frame selectively fetched to record the frame in the recording tape α out of all frames constituting a video input signal. Symbol (2-e) denotes a write enable signal for issuing the permission of selective write operation only to a frame selected by the record data section (2-d). Symbol (2-f) denotes a write reset signal for controlling resetting of write operation for the storing memory 4. Symbol (2-g) denotes an H.SW signal for controlling switching of the switching means 9, the rotation cycle of the head cylinder 8, and the read timing of the read controlling means 6. The half cycle of the H.SW signal (2-g) shows one track on the recording tape α. Symbol (2-h) denotes a read enable signal for controlling the timing of reading data from the storing memory 4. Symbol (2-i) denotes a read reset signal for controlling the read timing of the storing memory 4. Symbol (2-j) denotes a recording head switched in accordance with the H.SW signal (2-g). Symbol (2-k) denotes a record signal showing a signal to be recorded in one track on the recording tape α. Symbol (2-l) denotes a conceptual illustration of tracks and a frame recorded in the recording tape α.

In FIG. 3, symbols denote the following signals. Symbol (3-a) denotes a frame signal included in a video input signal. Symbol (3-b) denotes a signal-processing H.SW signal for recording data in the recording tape α synchronously with a frame signal. Symbol (3-c) denotes an output (modulated output) of the modulating means 3. Symbol (3-d) denotes a record data section showing a frame to be recorded in the recording tape α. Symbol (3-e) denotes a write enable for issuing a permission of write operation to the storing memory 4. Symbol (3-f) denotes a write reset signal for controlling resetting of the write operation for the storing memory 4.

Symbol (3-g) denotes an H.SW signal for controlling switching of the switching means 9, the rotation cycle of the head cylinder 8, and the read timing of the read controlling means 6. The half cycle of the H.SW signal (3-g) shows one track on the recording tape α. Symbol (3-h) denotes a read enable signal for controlling the timing for reading data from the storing memory 4. Symbol (3-i) denotes a read reset signal for controlling the read timing of the storing memory 4. Symbol (3-j) denotes a recording head switched in accordance with the H.SW signal (3-g). Symbol (3-k) denotes a record signal showing a signal to be recorded in one track on the recording tape α. Symbol (3-l) denotes a conceptual illustration showing tracks and a frame recorded in the recording tape α.

The configuration necessary for reproducing by the magnetic recording/reproducing apparatus is provided with reproducing-amplifying means 31, reproducing-rate adjusting means 39, demodulating means 35, digital-signal processing means 36, analog-signal processing means 37, controlling means 38, and tape running means 11.

The reproducing-amplifying means 31 amplifies a reproduction signal fetched from the recording tape α through the head cylinder 8 and switching means 9. The reproducing-rate adjusting means 39 adjusts a reproduced and amplified output supplied from the reproducing-amplifying means 31 so as to raise the reproducing rate of the output. The demodulating means 35 demodulates the reproduced and amplified output whose reproducing rate is adjusted. The digital-signal processing means 36 extends and error-corrects the demodulated output. The analog-signal processing means 37 performs the processing for outputting a video signal which is an output of the digital-signal processing means 36 to a unit outside of the apparatus. The controlling means 38 controls the processing for reproducing various signals. The tape running means 11 has a configuration same as the configuration necessary for recording and controls running of the recording tape α under reproducing.

The reproducing-rate adjusting means 39 has a storing memory 32, write controlling means 33, and read controlling means 34. The storing memory 32 writes a reproduced and amplified output supplied from the reproducing-amplifying means 31 and moreover reads the written reproduced and amplified output. The write controlling means 33 controls data write into the storing memory 32. The read controlling means 34 controls data read from the storing memory 32.

In FIG. 5, symbols denote the following signals. Symbol (5-a) denotes a frame signal for reproducing. Symbol (5-b) denotes an H.SW signal which controls the rotation of the head cylinder 8 and whose half cycle shows one track on the recording tape α. Symbol (5-c) denotes a reproducing head to be switched in accordance with the H.SW signal (5-b). Symbol (5-d) denotes a reproduction signal reproduced from the recording tape α. Symbol (5-e) denotes a write enable signal for selectively issuing the permission of write operation only to a predetermined frame for the storing memory 32. Symbol (5-f) a write reset signal for controlling resetting of the write operation for the storing memory 32. Symbol (5-g) denotes a signal-processing H.SW signal for controlling the read timing of the read controlling means 34 and the demodulation timing of the demodulating means 35. Symbol (5-h) denotes a read enable signal for controlling the read timing for the storing memory 32. Symbol (5-i) denotes a read reset signal for controlling the read timing of the storing memory 32. Symbol (5-j) denotes a demodulated output supplied from the demodulating means 35.

In FIG. 6, symbols denote the following signals. Symbol (6-a) denotes a frame signal for reproducing. Symbol (6-b) denotes an H.SW signal which controls the rotation of the head cylinder 8 and whose half cycle shows one track on the recording tape α. Symbol (6-c) denotes a reproducing head switched in accordance with the H.SW signal (6-b). Symbol (6-d) denotes a reproduction signal reproduced from the recording tape α. Symbol (6-e) denotes a write enable signal for selectively issuing the permission of write operation only to a predetermined frame for the storing memory 32. Symbol (6-f) denotes a write reset signal for controlling resetting of write operation for the storing memory 32. Symbol (6-g) denotes a signal-processing H.SW signal for controlling the red timing of the read controlling means 34 and the demodulation timing of the demodulating means 35. Symbol (6-h) denotes a read enable signal for controlling the read timing of the storing memory 32. Symbol (6-I) denotes a read reset signal for controlling the read timing of the storing memory 32. Symbol (6-j) denotes a demodulated output supplied from the demodulating means 35.

In the case of this embodiment, each means is constituted of the following. That is, input-signal converting means is constituted of the analog-signal processing means 1, digital-signal processing means 2, demodulating means 3, and controlling means 10. Recording means is constituted of the recording-amplifying means 7, switching means 9, head cylinder 8, controlling means 10, and tape running means 11. First write controlling means is constituted of the write controlling means 5. First read controlling means is constituted of the read controlling means 6. First storing means is constituted of the storing memory 34. Output-signal converting means is constituted of the analog-signal processing means 37, digital-signal processing means 36, demodulating means 35, and controlling means 38. Reproducing means is constituted of the reproducing-amplifying means 31, switching means 9, head cylinder 8, controlling means 38, and tape running means 11. Second write controlling means is constituted of the write controlling means 33. Second read controlling means is constituted of the read controlling means 34. Second storing means is constituted of the storing memory 32. However, these configurations are only example realizing the present invention. It is needless to say that the present invention is not restricted to these configurations.

Operations of a magnetic recording/reproducing apparatus having the above configurations are described below. In this case, a case is described in which a digital signal suitable for a compressibility of ten tracks per frame (hereafter abbreviated to 10 tracks/frame) for recording/reproducing a video signal of the broadcasting mode NTSC in accordance with the standard of a general digital video signal is first generated and then, recorded and reproduced through the recording/producing operation at a compressibility of five tracks per frame (hereafter abbreviated to 5 tracks/frame). Then, a digital signal suitable for the compressibility of 10 tracks/frame which is the above standard is converted to a digital signal suitable for the raised compressibility of 5 tracks/frame and recorded and reproduced through the recording/reproducing operation of 2.5 tracks per frame (hereafter abbreviated to 2.5/frame) in and from the recording tape α.

First, the recording operation of 10 tracks/frame is described below. A video input signal supplied from an external unit is input to the analog-signal processing means 1 in which the pedestal level of the video signal is fixed to a certain level to divide the signal into a brightness signal, a color signal, and color-difference signal. Then, the video input signal provided with the above processing is converted to a digital signal. In this case, the analog-signal processing means 1 generates the frame signal (2-*a*) in accordance with the video input signal and supplies the signal (2-*a*) to the digital-signal processing means 2 and controlling means 10. The frame signal (2-*a*) is generated to establish the operation timing between the digital-signal processing means 2 and analog-signal processing means 1 or the action timing between the head cylinder 8 and a mechanism section (including head cylinder 8 and switching means 9) on one hand and the analog-signal processing means 1 on the other. In the case of the broadcasting mode NTSC, the frame frequency is equal to 29.97 Hz. Therefore, the frame signal (2-*a*) has a frequency of 29.97 Hz.

The controlling means 10 to which the frame signal (2-*a*) is input generates the signal-processing H.SW signal (2-*b*) showing the modulation timing and the write timing for the storing memory 4 in accordance with the frame signal (2-*a*) in order to perform more minute timing control and supplies the signal (2-*b*) to the modulating means 3 and write controlling means 5. Moreover, the controlling means 10 generates the H.SW signal (2-*g*) serving as the criterion of head switching timing, criterion of head revolving speed, and criterion of read timing and supplies the signal (2-*g*) to the head cylinder 8, switching means 9, and read controlling means 6.

The controlling means 10 generates a signal having a cycle five times larger than that of the frame signal (2-*a*) and synchronizing with the frame signal (2-*a*) (149.85 Hz in the case of the broadcasting mode NTSC) as the signal-processing H.SW signal (2-*b*). Moreover, the controlling means 10 a signal (37.46 Hz) having a cycle ¼ the cycle of the signal-process H.SW signal (2-*b*) {cycle 1.25 times larger than that of the frame signal (2-*a*)} and synchronizing with the frame signal (2-*a*).

Frequencies (revolving speed) of the signal-processing H.SW signal (2-*b*) and H.SW signal (2-*d*) will be described later.

A digital video signal output from the analog-signal processing means 1 is compressed and added with an error code by the digital-signal processing means 2 and modulated by the modulating means 3 so that it has an energy distribution corresponding to the characteristic of the recording tape α. In this case, the modulated output (2-*c*) which is an output of the modulating means 3 is output in a signal form suitable for the output form of 10 tracks/frame synchronizing with the signal-processing H.SW signal (2-*b*) in accordance with a frame length specified by the frame signal (2-*a*). That is, in the case of the broadcasting mode NTSC, the cycle of the frame signal (2-*a*) is equal to 29.97 Hz. Therefore, the cycle of the signal-processing H.SW signal (2-*b*) is set to 149.85 Hz five times larger than that of the frame signal (2-*a*). Then, because the half cycle of the signal-processing H.SW signal (2-*b*) corresponds to one track on a tape, the modulated output (2-*c*) becomes a signal form of 10 tracks/frame coinciding with the standard of a general digital video signal and is output from the modulating means 3. Thus, the modulating means 3 generates and outputs the modulated output (2-*c*) having a signal form of 10 tracks/frame coinciding with the standard of a general digital video signal.

The modulated output (2-*c*) supplied from the modulating means 3 is written in the storing memory 4 by the write controlling means 5. In this case, the write controlling means 5 controls write timing in accordance with the signal-processing H.SW signal (2-*b*). Therefore, the modulated output (2-*c*) is written in the storing memory 4 while keeping a recording rate of 10 tracks/frame coinciding with the standard of a general digital vide signal.

Moreover, in this case, the write operation of the write controlling means 5 is controlled in accordance with the write enable signal (2-*e*) supplied from the controlling means 10. That is, because the write enable signal (2-*e*) is kept in a signal form for repeating write enable and write inhibit every frame whose length is specified in accordance with the frame signal (2-*a*), the write controlling means 5 whose write operation is controlled in accordance with the write enable signal (2-*e*) writes the modulated output (2-*c*) in the storing memory 4 under a frame-omitted state of selectively fetching one-frame data from the data for two consecutive frames and writing the one-frame data in the storing memory 4.

A modulated output (2-*c*)' under the frame-omitted state written in the storing memory 4 is read from the storing memory 4 by the read controlling means 6 and supplied to the recording-amplifying means 7. In this case, the read controlling means 6 controls read timing in accordance with the H.SW signal (2-*g*). That is, because the half cycle of the H.SW signal (2-*g*) corresponds to one track on the recording tape α, a track length specified in accordance with the H.SW signal (2-*g*) becomes four times larger than the track length specified in accordance with the signal-processing H.SW signal (2-*b*) by setting signal-processing H.SW signal (2-*g*) to ¼ of the signal-processing H.SW signal (2-*b*). However, the track length finally becomes approx. three times by including a track tilt angle. Moreover, the revolving speed of the head cylinder 8 specified in accordance with the signal-processing H.SW signal (2-*g*) becomes ¼ the revolving speed of the head cylinder 8 specified in accordance with the signal-processing H.SW signal (2-*b*). Therefore, the modulated output (2-*c*) is not kept in the signal form of 10 tracks/frame which is the standard of a general digital video signal, but the output (2-*c*) is provided with the signal form of 5 tracks/frame while the recording rate of each track is decreased to ½ the rate under modulation, read from the storing memory 4, and supplied to the recording-amplifying means 7.

The recording-amplifying means 7 sets a recording current and the like to the frame-omitted modulated output (2-*c*) which is input through the read controlling means 6 and whose recording rate is halved so that the maximum performance of the recording tape α can be shown and then supplies the output (2-*c*) to the switching means 9. The switching means 9 performs the following switching in accordance with the cycle of the H.SW signal (2-*g*) having the above signal form. That is, the switching means 9 controls switching so as to alternately supply the modulated output (2-*c*) to a pair of heads L and R (provided for radius-directional both ends on the periphery of the head cylinder 8) shown on the recording head (2-*j*) of the head cylinder 8. Moreover, the means 9 makes the switching cycle synchronize with the cycle of the H.SW signal (2-*g*). The H.SW signal (2-*g*) serves as the criterion of the switching cycle of the switching means 9 and its half cycle corresponds to one track {recording assignment of one head L (R)}.

The switching means 9 performs the above switching operation and makes the rotation of the head cylinder 8 synchronize with the H.SW signal (2-*g*). Then, the H.SW signal (2-*g*) serves as the criterion of the switching cycle of the switching means 9 and also serves as the rotational criterion of the head cylinder 8 and its half cycle corresponds to one track {recording assignment of one head L (R)}. Under the above state, by recording the frame-omitted modulated signal (2-*c*)' in the recording tape α, the record signal (2-*k*) having a cycle two times larger than that of a video input signal is frame-omitted at a rate of 1 frame/2 frames and converted into a signal form of 5 tracks/frame and then recorded in the recording tape a at ½ recording rate.

Then, the recording operation of 5 tracks/frame is described below in which the compressibility is improved compared to the case of 10 tracks/frame. A video input signal supplied from an external unit is input to the analog-signal processing means 1 similarly to the case of 10 tracks/frame to fix the pedestal level of the video input signal to a certain level and then divide the signal into brightness signal, color signal, and color-difference signal. Then, the video input signal provided with the above processing is converted to a digital signal. In this case, the analog-signal processing means 1 generates the frame signal (3-*a*) in accordance with the video input signal and supplies the signal (3-*a*) to the digital-signal processing means 2 and controlling means 10. The frame signal (3-*a*) is generated to establish the operation timing between the digital-signal processing means 2 and analog-signal processing means 1 or the action timing between the head cylinder 8 and a mechanism section (including the head cylinder 8 and switching means 9) on one hand and the analog-signal processing means 1 on the other. In the case of the broadcasting mode NTSC, a frame frequency is equal to 29.97 Hz. Therefore, the frame signal (3-*a*) is set to 29.97 Hz.

The controlling means 10 to which the frame signal (3-*a*) is input generates the signal-processing H.SW signal (3-*b*) showing modulation timing or the write timing for the storing memory 4 in accordance with the frame signal (3-*a*) and supplies the signal (3-*g*) to the modulating means 3 and write controlling means 5. Moreover, the controlling means 10 generates the H.SW signal (3-*b*) serving as the criterion of head switching timing, that of head revolving speed, and that of read timing to supply the signal (3-*g*) to the head cylinder 8, switching means 9, and read controlling means 6.

The controlling means 10 generates a signal (149.85 Hz in the case of the broadcasting mode NTSC) having a cycle five times larger than that of the frame signal (3-*a*) and synchronizing with the frame signal (3-*a*) as the signal-processing H.SW signal (3-*b*).

Moreover, the controlling means 10 generates a signal (37.46 Hz) having a cycle {cycle 1.25 times larger than that of the frame signal (3-*a*)} ¼ the cycle of the signal-processing H.SW signal (3-*b*) and synchronizing with the frame signal (3-*a*).

A digital video signal output from the analog-signal processing means 1 is compressed by the digital-signal processing means 2 at a compressibility higher than the case of 10 tracks/frame and added with an error correction code and then, modulated by the modulating means 3 so as to have an energy distribution corresponding to the characteristic of the recording tape α. In this case, the modulated output (3-*c*) which is an output of the modulating means 3 synchronizes with the signal-processing H.SW signal (3-*b*) in accordance with a frame length specified by the frame signal (3-*a*), and valid data and invalid data are alternately output every half cycle of the signal (3-*b*) and the valid data is output in a signal form suitable for the output form of 5 tracks/frame. That is, because the cycle of the frame signal (3-*a*) is equal to 29.97 Hz in the case of the broadcasting mode NTSC, the cycle of the signal-processing H.SW signal (3-*b*) is set to 149.85 Hz five times larger than that of the frame signal (3-*a*). Then, because the half cycle of the signal-processing H.SW signal (3-*b*) corresponds to one track on a tape, the modulated output (3-*c*) is converted into a signal form for alternately repeating valid data and invalid data every track among signal forms coinciding with the standard of a general digital video signal of 10 tracks/frame and output from the modulating means 3. Thus, the modulating means 3 generates and outputs the modulated output (3-*c*) having a signal form of 5 tracks/frame improved in compressibility compared to the case of a general digital video signal of 10 tracks/frame.

The modulated output (3-*c*) supplied from the modulating means 3 is written in the storing memory 4 by the write controlling means 5. In this case, the write controlling means 5 controls write timing in accordance with the signal-processing H.SW signal (3-*b*). Therefore, in the case of the modulated output (3-*c*), a valid-data part having only the enable part out of alternately repetitive enable and inhibit parts of the write enable signal (3-*e*) is written in the storing memory 4, that is, under a state of 5 tracks/frame.

The modulated output (3-*c*) written in the storing memory 4 is read from the storing memory 4 by the read controlling means 5 and supplied to the recording-amplifying means 7. In this case, the read controlling means 6 controls read timing in accordance with the H.SW signal (3-*g*). In this case, because the H.SW signal (3-*g*) is set to a cycle ¼ the cycle of the signal-processing H.SW signal {cycle 1.25 times larger than the cycle of the frame signal (3-*a*)}, the modulated output (3-*c*) is read from the storing memory 4 not in the output form (10 tracks/frame) suitable for the standard of a general digital video signal but in the signal form of 2.5 tracks/frame and in a state in which the recording rate of each track is changed to ½ the rate under modulation and supplied to the recording-amplifying means 7.

The recording-amplifying means 7 sets a recording current and the like to the modulated output (3-*c*) supplied through the read controlling means 6 so as to show the maximum performance of the recording tape α and then supplies the output (3-*c*) to the switching means 9. The switching means 9 performs the following switching in accordance with the cycle of the H.SW signal (3-*g*).

That is, the switching means 9 controls switching so as to alternately supply the modulated output (3-*c*) to the same heads L and R as the case of 10 tracks per frame. Moreover, the means 9 makes the switching cycle switching cycle synchronize with the cycle of the H.SW signal (3-*g*). The H.SW signal (3-*g*) serves as the criterion of the switching cycle of the switching means 9 and its half cycle corresponds to one track {recording assignment of one head L (R)}. Moreover, the heads L and R are provided for the radius-directional both ends of the periphery of the head cylinder 8 and details are shown on the recording head (3-*j*).

The switching means 9 performs the above switching operation and makes the rotation of the head cylinder 8 synchronize with the H.SW signal (3-*g*). Then, the H.SW signal (3-*g*) serves as the criterion of the switching cycle of the switching means 9 or that of the rotation of the head cylinder 8 and its half cycle corresponds to one track {recording assignment of one head L (R)}. Under the above state, the signal (3-*g*) is converted into the signal form of 2.5 tracks/frame and recorded in the recording tape α at ½ recording rate.

In this case, the controlling means 10 and read controlling means 6 set output forms of the record signal (2-*k*) of 5 tracks/frame and record signal (3-*k*) of 2.5 tracks/frame as described below.

The output form of 5 or 2.5 tracks/frame is set which uses the number (5) or (2.5) obtained by dividing an integer 10 or 5 denoting the number of tracks for 10 or 5 tracks/frame by an integer (2) smaller than the number of tracks as the reduced number of tracks. Thereby, each track of the recording tape a is divided into two track division areas and the following signal is recorded in each track division area. That is, signal areas arranged to constitute recording tracks in the modulated outputs (2-c) and (3-c) are regularly assigned to each track division area and thereby, a recording/reproducing accuracy can be kept in a preferable state.

Moreover, in this case, the tape running means 11 sets a tape running rate as described below. That is, by lowering the revolving speed of the head cylinder 8 while keeping a tape feed rate constant, the interval between recording tracks formed on the recording tape α (interval between recording tracks adjacent in the longitudinal direction of the tape) excessively increases. Thus, a trouble occurs that the length of the recording tape α required for recording increases to deteriorate the operating efficiency of the tape. Therefore, the tape running means 11 prevents the above trouble from occurring by adjusting (lowering) the tape feed rate in accordance with the revolving speed of the head cylinder 8 even if the speed lowers.

The accuracy of a mechanism (not illustrated) for rotating the head cylinder 8 depends on the head revolving speed. In the case of this magnetic recording/reproducing apparatus, however, the revolving speed of the head cylinder 8 is made lower (¼) than the revolving speed (specified in accordance with signal-processing H.SW signal) specified when the modulated output (2-c) or (3-c) is generated. Therefore, the accuracy requested for the rotating mechanism is lowered by a value equivalent to the decrement of the revolving speed) and the accuracy of the mechanism for rotating the head cylinder 8 is lowered, and thereby it is possible to cut the cost. Moreover, to rotate the head cylinder 8 at a high speed, it is necessary to regularly execute high-accuracy maintenance. However, because the revolving speed of the head cylinder 8 is made lower than the revolving speed corresponding to modulation, the high-accuracy maintenance is unnecessary and it is possible to cut the cost by a value equivalent to the abolition of the high-accuracy maintenance.

Moreover, in the case of this magnetic recording/reproducing apparatus, the storing memory 4 serving as a buffer memory is set between the modulating means 3 and recording-amplifying means 7. Thus, the timing for writing the modulated output (2-c) or (3-c) in the storing memory 4 is controlled by the write controlling means 5 so that the timing becomes the write timing corresponding to the number of tracks per frame previously specified for modulation or the like (timing specified in accordance with signal-processing H.SW signal). Moreover, the timing for reading data from the storing memory 4 to the recording-amplifying means 7 is controlled by the read controlling means 6 so that the timing becomes the read timing (timing specified by H.SW signal) corresponding to the reduced number of tracks (5 or 2.5 tracks/frame). Thereby, it is possible to accurately transfer the modulated output between the modulating means 3 and recording-amplifying means 7.

Furthermore, the write controlling means 5 is constituted so as to be able to fine adjust the timing for writing the modulated output in the storing memory 4. Therefore, it is possible to arrange data on the recording track α so that the data can be easily obtained even under the search operation in which the on-track phenomenon does not occur when reproducing the recording tape α. Furthermore, because the read controlling means 6 is constituted so as to be able to fine adjust the timing for reading the modulated output from the storing memory 4, the same advantage as the case of fine adjusting the write timing of the write controlling means 5 is obtained.

Thus, it is possible to equalize the configuration of the head cylinder 8 for 10 tracks/frame with that of the head cylinder 8 for 5 tracks/frame improved in compressibility. Therefore, the mechanism and accuracy of the head cylinder 8 are simplified and the requested accuracy is also lowered. Thus, it is possible to lower the accuracy of the mechanism for rotating the head cylinder 8 and cut the cost.

Moreover, by changing output cycles of the modulating means 3 and write cycles onto the recording tape α and adjusting these timings by the storing memory 4, it is possible to lower the revolving speed of the head cylinder 8 and decrease a recording wavelength. Therefore, it is possible that data can be recorded in or reproduced from the recording tape α not corresponding to a high recording rate or the mechanism of a magnetic recording/reproducing apparatus. Moreover, it is possible to make the recording tape α correspond to long-time recording such as monitoring recording conforming to frame-omitted recording.

Then, the reproducing operation of 10 tracks/frame is described below. Under reproducing, the controlling means 38 generates the H.SW signal (5-b) and signal-processing H.SW signal (5-g) in accordance with the frame signal (5-a) generated inside or outside of a unit. The H.SW signal (5-b) serves as the criterion of the rotation of the head cylinder 8, that of the switching timing of the switching means 9, or that of the write timing of the write controlling means 33. The signal-processing H.SW signal (5-g) serves as the criterion of the read timing of the read controlling means 34 from the storing memory 32 or that of the demodulation timing of the demodulating means 35.

The controlling means 38 supplies the H.SW signal (5-b) generated as described above to the head cylinder 8, switching means 9, and write controlling means 33. Moreover, the controlling means 38 supplies the signal-processing H.SW signal (5-g) to the read controlling means 34 and demodulating means 35.

Under the above state, the head cylinder 8 is rotated to reproduce the record signal (2-k) from the recording tape α by a pair of heads L and R of the reproducing head (5-c). In this case, by making the revolving speed of the head cylinder 8 synchronize with the H.SW signal (5-b), the record signal (2-k) is reproduced in the same signal form as the case of recording. That is, as described above, by omitting frames from a video input signal at a rate of one-frame/two-frames, the record signal (2-k) is recorded in the recording tape α in the signal form of 5 tracks/frame and at a recording rate ½ the case of modulation. Therefore, by equalizing the cycle of the H.SW signal (5-b) to be supplied to the head cylinder 8 and switching means 9 with the cycle of the H.SW signal (2-g) in the above configuration under recording, the record signal (2-k) is reproduced in the same signal form and at the same recording rate and the reproduction signal (5-d) of the signal (2-k) is supplied to the reproducing-amplifying means 31. Specifically, the H.SW signal (5-b) is generated as a signal (37.46 Hz in the case of the broadcasting mode NTSC) having a cycle 1.25 times larger than that of the frame signal (5-a) [29.97 Hz in the case of the broadcasting mode NTSC] and the reproduction signal (5-d) is output synchronously with the H.SW signal (5-b) having the above cycle.

The reproducing-amplifying means 31 amplifies the input reproduction signal (5-d) and supplies the signal (5-d) to the write controlling means 33. The write controlling means 33 writes an output supplied from the reproducing-amplifying means 31 in the storing memory 32 while controlling write timing. In this case, because the write controlling means 33 controls write timing in accordance with the H.SW signal (5-b), an output of the reproducing-amplifying means 31 is written in the storing memory 32 while keeping the signal form of the record signal (2-k).

The output of the reproducing-amplifying means 31 written in the storing memory 32 is read from the storing memory 32 while the read timing is controlled by the read controlling means 34 and supplied to the demodulating means 35. In this case, the read timing of the read controlling means 34 is controlled in accordance with the signal-processing H.SW signal (5-*g*). In this case, because the signal-processing H.SW signal (5-*g*) is set to a cycle four times larger than that of the H.SW signal (5-*b*) {five times larger than that of the frame signal (5-*a*)}, an output of a signal form coinciding with the output form of 10 tracks/frame (standard of general digital video signal) is read from the storing memory 32 and supplied to the demodulating means 35.

Moreover, in this case, the read operation of the read controlling means 34 is controlled in accordance with the 3 read enable signal (5-*h*) supplied from the controlling means 38. That is, the reproduction signal (5-*d*) having a signal form of 5 tracks/frame which is converted into a signal form of 10 tracks/frame and whose recording rate is changed to two times the recording rate under recording is output from the storing memory 31. Therefore, an output of the storing memory 32 is frame-omitted at a rate of one-frame/2-frames.

However, because the read enable signal (5-*h*) is kept in a signal form for repeating read enable and read inhibit every two tracks of the signal-processing H.SW signal (5-*g*), the read controlling means 34 whose read operation is controlled in accordance with the read enable signal (5-*h*) selectively fetches the data of only a valid frame from the data for two consecutive frames and reads them from the storing memory 32, that is, intermittently reads data from the storing memory 32 by selecting only valid signal areas from outputs of the storing memory 32.

The demodulating means 35 demodulates the data modulated in accordance with the characteristic of the recording tape α under recording and supplies the demodulated output (5-*j*) to the digital-signal processing means 36. In this case, the demodulating means 35 generates the demodulated output (5-*j*) while keeping a rate of 10 tracks/frame (standard of general digital video signal) by performing demodulation synchronously with the signal-processing H.SW signal (5-*g*) and supplies the output (5-*j*) to the digital-signal processing means 36.

The digital-signal processing means 36 error-corrects and error-revises the supplied demodulated output (5-*j*) and expands compressed data and supplies them to the analog-signal processing means 37. In this case, the digital-signal processing means 36 processes signals synchronously with the frame signal (5-*a*) supplied from the controlling means 38.

The analog-signal processing means 37 converts an output supplied from the digital-signal processing means 36 to an analog signal and outputs the analog signal to a unit outside of the apparatus as a reproduced video signal.

Then, the reproducing operation of 5 tracks/frame improved in compressibility compared to the case or 10 tracks/frame is described below. Under the reproducing operation, the controlling means 38 generates the H.SW signal (6-*b*) and signal-processing H.SW signal (6-*g*) in accordance with the frame signal (6-*a*) generated inside or outside of a unit. The H.SW signal (6-*b*) serves as the criterion of the rotation of the head cylinder 8, that of the switching timing of the switching means 9, or that of the write timing of the write controlling means 33. The signal-processing H.SW signal (6-*g*) serves as the criterion of the read timing of the read controlling means 34 from the storing memory 32 or that of the demodulation timing of the demodulating means 35.

The controlling means 38 supplies the H.SW signal (6-*b*) generated as described above to the head cylinder 8, switching means 9, and write controlling means 33. Moreover, the controlling means 38 supplies the signal-processing H.SW signal (6-*g*) to the read controlling means 34 and demodulating means 35.

Under the above state, the controlling means 38 rotates the head cylinder 8 and reproduces the record signal (3-*k*) from the recording tape α by a pair of heads L and R of the reproducing head (6-*c*) same as the case of 10 tracks/frame. In this case, by making the revolving speed of the head cylinder 8 synchronize with the H.SW signal (6-*b*), the record signal (3-*k*) is reproduced in the same signal form as the case of recording. That is, the record signal (3-*k*) is recorded in the recording tape α in a signal form of 2.5 tracks/frame and at a recording rate ½ the case of modulation. Therefore, by equalizing the cycle of the H.SW signal (6-*b*) to be supplied to the head cylinder 8 and switching means 9 with that of the H.SW signal (6-*g*) in the above configuration under recording, the record signal (3-*k*) is reproduced in the same signal form and at the same recording rate and the reproduction signal (6-*d*) of the signal (3-*k*) is supplied to the reproducing-amplifying means 31. Specifically, the H.SW signal (6-*b*) is generated as a signal having a cycle (37.46 Hz in the case of the broadcasting mode NTSC) 1.25 times larger than that of the frame signal (6-*a*) [29.97 Hz in the case of the broadcasting mode NTSC] and the reproduction signal (6-*d*) is output synchronously with the H.SW signal (6-*b*) having the above cycle.

The reproducing-amplifying means 31 amplifies the input reproduction signal (6-*d*) and then, supplies the signal (6-*d*) to the write controlling means 33. The write controlling means 33 writes an output supplied from the reproducing-amplifying means 31 in the storing memory 32 while controlling write timing. In this case, the write controlling means 33 controls the write timing in accordance with the H.SW signal (6-*b*). Therefore, an output of the reproducing-amplifying means 31 is written in the storing memory 32 while the signal form of the record signal (3-*k*) is kept.

The output of the reproducing-amplifying means 31 written in the storing memory 32 is read from the storing memory 32 while read timing is controlled by the read controlling means 34 and supplied to the demodulating means 35. In this case, the read timing of the read controlling means 34 is controlled in accordance with the signal-processing H.SW signal (6-*g*). In this case, because the signal-process H.SW signal (6-*g*) is set to a cycle four times larger than that of the H.SW signal (6-*b*) {five times larger than that of the frame signal (5-*a*)}, an output of a signal form coinciding with the output form of 5 tracks/frame is read from the storing memory 32 and supplied to the demodulating means 35.

Moreover, in this case, the read operation of the read controlling means 34 is controlled in accordance with the read enable signal (6-*h*) supplied from the controlling means 38. That is, the reproduction signal (6-*d*) having a signal form of 2.5 tracks/frame is converted to a signal form of 5 tracks/frame and output while the recording rate is changed to two times compared to the case of recording from the storing memory 31.

However, the read enable signal (6-*h*) is kept in a signal form of repeating read enable and read inhibit every half cycle of the signal-processing H.SW signal (6-*g*). The read controlling means 34 whose read operation is controlled in accordance with the read enable signal (6-*h*) outputs a signal corresponding to the modulated output (3-*c*) to the demodulating means 35. Therefore, data is intermittently read from only a valid signal area in the storing memory 32 among outputs of the memory 32.

The demodulating means 35 demodulates the data modulated in accordance with the characteristic of the recording tape α under recording and supplies the demodulated output (6-*j*) to the digital-signal processing means 36. In this case, the demodulating means 35 generates the demodulated output (6-*j*) while keeping the rate of 5 tracks/frame by performing demodulation synchronously with the signal-processing H.SW signal (6-*g*) and supplies the output (6-*j*) to the digital-signal processing means 36.

The digital-signal processing means 36 error-corrects and error-revises the input demodulated output (6-*j*) and expands compressed data and supplies them to the analog-signal processing means 37. In this case, the digital-signal processing means 36 processes signals synchronously with the frame signal (6-*a*) supplied from the controlling means 38.

The analog-signal processing means 37 converts an output of the digital-signal processing means 36 to an analog signal and outputs the signal to a unit outside of the apparatus as a reproduced video signal.

Thus, a magnetic recording/reproducing apparatus of the present invention generates the modulated output (2-*c*) or (3-*c*) coinciding with the rate of 10 tracks/frame which is the standard of a general digital video signal or the rate of 5 tracks/frame raised in compressibility by using the modulating means 3, changes the modulated output (2-*c*) or (3-*c*) to an output form of 5 or 2.5 tracks/frame having the number of tracks reduced up to ½ the number of tracks of the above output form and records the output form in the recording tape α. Therefore, signals for tracks in the output form of a general digital video signal are recorded in one track of the recording tape α. Then, when the signals are reproduced, they are respectively returned to the demodulated output (5-*j*) or (6-*j*) coinciding with the rate of 10 tracks/frame which is the standard of a general digital video signal or the rate of 5 tracks/frame raised in compressibility and output under demodulation.

In this case, the reproducing head (5-*c*) or (6-*c*) uses the head L or R of the same head cylinder 8. Therefore, even in the case of 10 tracks/frame or 5 tracks/frame raised in compressibility, it is possible to realize recording and reproducing operations with the same head configuration, simplify the configuration and control of a mechanism, and cut the fabrication cost. Reasons for the above are described below.

In the case of 10 tracks/frame, the half turn of the H.SW signal (2-*g*) corresponds to one track. However, when recording are performed by a conventional configuration by raising compressibility, one turn of a head cylinder corresponds to one track. Therefore, it is necessary to prepare a head for each case due to the difference in compressibility.

However, in the case of a magnetic recording/reproducing apparatus of the present invention, the half turn of the head cylinder 8 corresponds to one track even when recording and reproducing are performed by raising compressibility. Therefore, it is unnecessary to prepare a head every compressibility and use a configuration completely the same as that of a head cylinder when performing recording and reproducing independently of compressibility, and it is unnecessary to change configurations of a head.

Moreover, in the case of a magnetic recording/reproducing apparatus of the present invention, it is possible to simplify the configuration of the mechanism and cut the fabrication cost. The reasons are described below.

The head cylinder 8 rotates at the same revolving speed as the case of the H.SW signals (2-*g* and 5-*b*) or (3-*g* and 6-*b*) and the revolving speed becomes 1.25 times larger than the cycle of frame signals (2-*a* and 5-*a*) or (3-*a* and 6-*a*). However, when recording and reproducing are performed in accordance with the standard of a general digital video tape, the rotation cycle of the head cylinder 8 becomes five times larger than the case of the frame signals (8-*a* and 10-*a*). Therefore, in the case of the magnetic recording/reproducing apparatus of this embodiment, it is possible to simplify the configuration of the mechanism and cut the fabrication cost because it is possible to decrease the revolving speed of the head cylinder 8 to a value ¼ the conventional revolving speed.

Moreover, in the case of a magnetic recording/reproducing apparatus of the present invention, it is possible to cut the running cost. The reason is described below.

To keep a mechanism for supporting the high-speed head cylinder 8 at a high accuracy, it is inevitable to require a lot of time for maintenance under operation and this cause the running cost of a magnetic recording/reproducing apparatus to rise. In the case of a magnetic recording/reproducing apparatus of the present invention, however, because it is possible to lower the rotation cycle of the head cylinder 8, it is unnecessary to execute the above maintenance requiring a lot of time and thereby, lower the running cost.

Moreover, according to an magnetic recording/reproducing apparatus of the present invention, because the recording tape α corresponding to a comparatively low recording rate of ½ the recording rate under demodulation can be used, it is possible to lower the fabrication cost of the recording tape a by a value equivalent to the decrement of the recording rate.

Moreover, in the case of a magnetic recording/reproducing apparatus of the present invention, it is preferable to perform the following even under the search operation in which the on-track phenomenon does not occur when reproducing a recording tape in order to improve the recording/reproducing accuracy. That is, when arranging data on a recording track, it is preferable to match relative timings for recording and reproducing signals for two tracks (signals for two tracks in general digital video signals) recorded in each track. Thus, data can be easily obtained.

The above timing adjustment can be realized by fine adjusting relative positions of signals for two tracks on tracks. Moreover, the above fine adjustment of relative positions can be realized by adjusting write or read timing for the storing memories 4 and 32 by the write controlling means 5 and 33 or read controlling means 6 and 34.

In the case of the magnetic recording/reproducing apparatus of the above embodiment, it is apprehended that the information content to be recorded in each track is doubled in order to record signals for two tracks in general digital video signals and thereby, the information density to be written in each track is doubled and thus, sufficient information cannot be written. In this case, it is possible to correspond to the above trouble by setting the recording tape α as described below. That is, in the case of the standard of a general digital video signal, a recording tape $α_D$ having a width of ¼" is used to record or reproduce the general digital video signal. However, a recording tape $α_A$ having a width of ½" is used in the case of the VHS standard which is the standard of a general analog video signal. Therefore, signals for two tracks can be recorded in each track at a sufficient information density by using the recording tape $α_A$ conforming to the VHS standard to record or reproduce the above digital video signal and thereby, setting the track length of the recording table $α_A$ to a value two times or more larger than that of the digital recording tape $α_D$.

Moreover, in the case of a magnetic recording/reproducing apparatus, there is a relation of λ=V/f between signal wavelength λ, tape speed V, and signal frequency f in general. According to the relation, as the revolving speed of the head cylinder 8 lowers, the wavelength of a signal to be recorded/reproduced by the head cylinder 8 proportionally decreases. In general, however, the fabrication cost rises as the wavelength of a signal to be handled by a circuit component (particularly, circuit component used for digital processing) constituting a magnetic recording/reproducing apparatus decreases. Therefore, in the case of a magnetic recording/reproducing apparatus of the present invention capable of decreasing the rotation cycle of the head cylinder 8 to ½ the conventional cycle, an expensive circuit component corresponding to a short wavelength must be used and thereby, it is apprehended that the fabrication cost rises.

Even in the above case, by applying a magnetic recording/reproducing apparatus conforming to the VHS standard which is the standard of a general analog video signal as a recording/reproducing apparatus of the present invention, it is possible to cancel the above apprehensions.

That is, a head cylinder $8_D$ used to record/reproduce the recording tape $α_D$ in accordance with a general digital video standard has a diameter of 21 mm while a head cylinder $8_A$ used to record/reproduce the recording tape $α_A$ in accordance with the VHS standard has a diameter of 62 mm. Therefore, the diameter of the head cylinder $8_A$ for VHS is three times larger than that of the cylinder head $8_D$. In the case of a magnetic recording/reproducing apparatus, there is the relation of λ=V/f between signal wavelength λ, tape speed V, and signal frequency f as described above and the tape speed V is proportional to the diameter of a head cylinder. Therefore, when comparing cases of recording/reproducing data while rotating the both head cylinders $8_D$ and $8_A$ at the same cycle, it is found that the recording/reproducing wavelength λ of the head cylinder $8_A$ for VHS becomes approx. three times larger than the recording/reproducing wavelength of the head cylinder $8_D$ for digital video.

Therefore, when applying a configuration of the present invention to a recording/reproducing apparatus conforming to the VHS standard, wavelength contraction (½λ) due to decrease of the revolving speed of the head cylinder 8 and wavelength expansion (3λ) due to increase of the diameter of the head cylinder 8 occur at the same time. Thus, it is possible to increase the recording/reproducing wavelength to a value approx. 1.5 times (3/2λ) larger than the recording/reproducing wavelength when recording/reproducing data in accordance with the standard of a general digital video signal. Therefore, it is possible to simplify a circuit configuration and cut the fabrication cost.

Also in the case of the magnetic recording/reproducing apparatus of the embodiment of the present invention above described, because signals for two tracks in general digital video signals are recorded in each track of the recording tape α, the information content to be recorded in each track is increased to two times. Thus, the information density to be written in each track is doubled and thereby, it is apprehended that sufficient information cannot be written. Also in this case, by making the mechanism of a magnetic recording/reproducing apparatus and the recording tape α coincide with an existing analog video signal standard such as the VHS standard, it is possible to cancel the above trouble.

The above embodiment is described by using an example in which the number of tracks per frame is constituted of 5 tracks and 2.5 tracks. Moreover, by changing cylinder revolving speeds and read clocks of the storing memories 4 and 32 and thereby setting the number of tracks per frame to 10 tracks and 5 tracks, it is possible to execute the same.

For the above embodiment, a case is described in which recording means is constituted by including recording-amplifying means, switching means, a head cylinder, controlling means, and tape running means and a modulated output which is an output of the recording-amplifying means is alternately supplied to heads L and R of a head cylinder by the switching means in accordance with the cycle of an H.SW signal.

However, it is also permitted to constitute recording means by including recording-amplifying means, a head cylinder, controlling means, and tape running means and supply an output of the recording-amplifying means to the head cylinder. In this case, it is also possible to simultaneously supply a modulated output which is an output of the recording-amplifying means to the heads L and R of the head cylinder instead of alternately supplying the modulated output to the heads L and R of the head cylinder by the switching means in accordance with the cycle of an H.SW signal.

INDUSTRIAL APPLICABILITY

According to the present invention, even in the case of track configurations in which the number of tracks per division of signal differs due to the difference in compressibility, an exclusive head-cylinder configuration is not necessary for each track configuration and an advantage is obtained that recording and reproducing can be realized by the same head configuration.

Moreover, even in the case of a VTR format requiring high cylinder revolving speed, high recording rate, and short recording wavelength and moreover, exclusive tape and mechanism corresponding to the cylinder revolving speed, recording rate, and recording wavelength, an advantage is obtained that recording and reproducing can be performed by an inexpensive general-purpose tape and a mechanism requiring a small maintenance cost not corresponding to a high recording rate by lowering the revolving speed of a head cylinder and decreasing a recording wavelength.

What is claimed is:

1. A magnetic recording/reproducing apparatus comprising:

input-signal converting means for converting an input signal to a record signal through a modulation performed at the timing corresponding to a previously-specified number of tacks per division of signal;

recording-rate adjusting means for adjusting a recording rate of said record signal so as to lower the recording rate; and recording means for rotating a head cylinder at a revolving speed lower than the revolving speed of a head cylinder corresponding to the timing at said modulation and corresponding to the cording rate adjusted by said recording-rate adjusting means to record the record signal after the recording rate is adjusted in a recording tape.

2. The magnetic recording/reproducing apparatus according to claim 1, comprising:

reproducing means reproducing the record signal from said recording tape by rotating a head cylinder at the head revolving speed set by said recording means;

reproducing-rate adjusting means for adjusting the reproducing rate of a reproduction signal output from said reproducing means so as to raise the reproducing rate up to a rate suitable for modulation performed at the timing corresponding to said previously-specified number of tracks per division of signal; and output-signal converting means for converting a reproduction signal whose reproducing rate is adjusted by said reproducing-rate adjusting means to an output signal through demodulation performed at the timing corresponding to said previously-specified number of tracks per division of signal.

3. The magnetic recording/reproducing apparatus according to claim 1, wherein said recording means keeps the revolving speed of said head cylinder constant even when said previously-specified number of tracks per division of signal differs due to the difference in compressibility of said record signal.

4. The magnetic recording/reproducing apparatus according to claim 1, wherein said recording means keeps a configuration of said head cylinder same even when said previously-specified number of tracks per division of signal differs due to the difference in compressibility of said record signal.

5. The magnetic recording/reproducing apparatus according to claim 2, wherein said recording means adjusts the feed rate of a recording tape under recording correspondingly to a set head-cylinder revolving speed.

6. The magnetic recording/reproducing apparatus according to claim 2, wherein said reproducing means keeps the revolving speed of said head cylinder constant even when said previously-specified number of tracks per division of signal differs due to the difference in compressibility of said reproduction signal.

7. The magnetic recording/reproducing apparatus according to claim 2, wherein said reproducing means keeps a configuration of said head cylinder same even when said previously-specified number of tracks per division of signal differs due to the difference in compressibility of said reproduction signal.

8. The magnetic recording/reproducing apparatus according to claim 5, wherein said recording means sets the revolving speed of a head cylinder to the reduced number of tracks set by dividing said previously-specified number of tracks per division of signal by an integer smaller than the above previously-specified number of tracks so that said division of signal is divided.

9. The magnetic recording/reproducing apparatus according to claim 5, wherein said reproducing means adjusts the feed rate of a recording tape under reproducing in accordance with a set head-cylinder revolving speed.

10. The magnetic recording/reproducing apparatus according to claim 8, wherein said recording-rate adjusting means includes:

first storing means;

first write controlling means for writing said record signal in said first storing means at the write timing corresponding to said previously-specified number of tracks per division of signal; and first read controlling means for reading said record signal from said first storing means at the timing corresponding to said reduced number of tracks and supplies the signal to said recording means.

11. The magnetic recording/reproducing apparatus according to claim 10, wherein said first read controlling means reads said record signal from said first storing means at a read clock rate lower than a write clock rate for said first storing means.

12. The magnetic recording/reproducing apparatus according to claim 10, wherein said first write controlling means fine adjusts said write timing.

13. The magnetic recording/reproducing apparatus according to claim 10, wherein said first read controlling means fine adjusts said read timing.

14. The magnetic recording/reproducing apparatus according to claim 10, wherein said reproducing-rate adjusting means includes:

second storing means;

second write controlling means for said reproduction signal in said second storing means at the write timing corresponding to said reduced number of tracks; and second read controlling means for reading said reproduction signal from said second storing means at the timing corresponding to said previously-specified number of tracks per division of signal and supplies the signal to said output-signal converting means.

15. The magnetic recording/reproducing apparatus according to claim 14, wherein said second read controlling means reads the reproduction signal from said second storing means at a read clock rate higher than a write clock rate for said second storing means.

16. The magnetic recording/reproducing apparatus according to claim 14, wherein said second write controlling means fine adjusts said write timing.

17. The magnetic recording/reproducing apparatus according to claim 14, wherein said second read controlling means fine adjusts said read timing.

18. The magnetic recording/reproducing apparatus according to claim 2, wherein said input-signal converting means selectively fetches an input signal of one signal division every a plurality of signal divisions and converts the signal to a record signal.

19. The magnetic recording/reproducing apparatus according to claim 18, wherein said recording means records said record signal in a recording tape while lowering the recording rate of the record signal.

20. The magnetic recording/reproducing apparatus according to claim 19, wherein said output-signal converting means returns the recording rate lowered by said recording means to the original recording rate when converting said reproduction signal to said output signal.

* * * * *